US011159521B2

(12) United States Patent
Kawamura et al.

(10) Patent No.: US 11,159,521 B2
(45) Date of Patent: Oct. 26, 2021

(54) INFORMATION PROCESSING APPARATUS AND INFORMATION PROCESSING METHOD

(71) Applicant: FeliCa Networks, Inc., Tokyo (JP)

(72) Inventors: Seiji Kawamura, Tokyo (JP); Aya Miyazawa, Chiba (JP); Yasumasa Nakatsugawa, Kanagawa (JP)

(73) Assignee: FELICA NETWORKS, INC., Tokyo (JP)

( * ) Notice: Subject to any disclaimer, the term of this patent is extended or adjusted under 35 U.S.C. 154(b) by 228 days.

(21) Appl. No.: 16/465,822

(22) PCT Filed: Nov. 9, 2017

(86) PCT No.: PCT/JP2017/040480
§ 371 (c)(1),
(2) Date: May 31, 2019

(87) PCT Pub. No.: WO2018/105304
PCT Pub. Date: Jun. 14, 2018

(65) Prior Publication Data
US 2019/0306165 A1 Oct. 3, 2019

(30) Foreign Application Priority Data

Dec. 9, 2016 (JP) .............................. JP2016-239379

(51) Int. Cl.
*H04L 29/06* (2006.01)
*H04L 9/32* (2006.01)
(Continued)

(52) U.S. Cl.
CPC .......... *H04L 63/0869* (2013.01); *G06F 21/44* (2013.01); *G09C 1/00* (2013.01); *H04L 9/32* (2013.01); *H04L 63/0442* (2013.01)

(58) Field of Classification Search
CPC ... H04L 63/0869; H04L 9/32; H04L 63/0442; G06F 21/44; G06F 21/572; G06F 2221/2103; G06F 2221/2153; G09C 1/00
See application file for complete search history.

(56) References Cited

U.S. PATENT DOCUMENTS

| 2009/0281947 A1* | 11/2009 | Erel ........................ H04W 4/24 705/44 |
| 2016/0321654 A1* | 11/2016 | Lesavich .............. G06Q 20/321 |
| 2018/0167208 A1* | 6/2018 | Le Saint ................... H04L 9/14 |

FOREIGN PATENT DOCUMENTS

| DE | 102014214041 A1 | 2/2015 |
| WO | WO 2007/149830 A2 | 12/2007 |

(Continued)

OTHER PUBLICATIONS

Oct. 30, 2019, European Search Report issued for related EP Application No. 17877546.6.

*Primary Examiner* — Mohammed Waliullah
(74) *Attorney, Agent, or Firm* — Paratus Law Group, PLLC

(57) ABSTRACT

Provided is an information processing apparatus including: a processing unit configured to execute processing of authenticating an external apparatus through communication with the external apparatus which is a communication target and processing of updating information to be updated through communication with the external apparatus, as a series of processing.

14 Claims, 11 Drawing Sheets

(51) Int. Cl.
*G06F 21/44* (2013.01)
*G09C 1/00* (2006.01)

(56) References Cited

FOREIGN PATENT DOCUMENTS

| WO | WO 2012/035850 A1 | 3/2012 |
| WO | WO 2016/075865 A1 | 5/2016 |

* cited by examiner

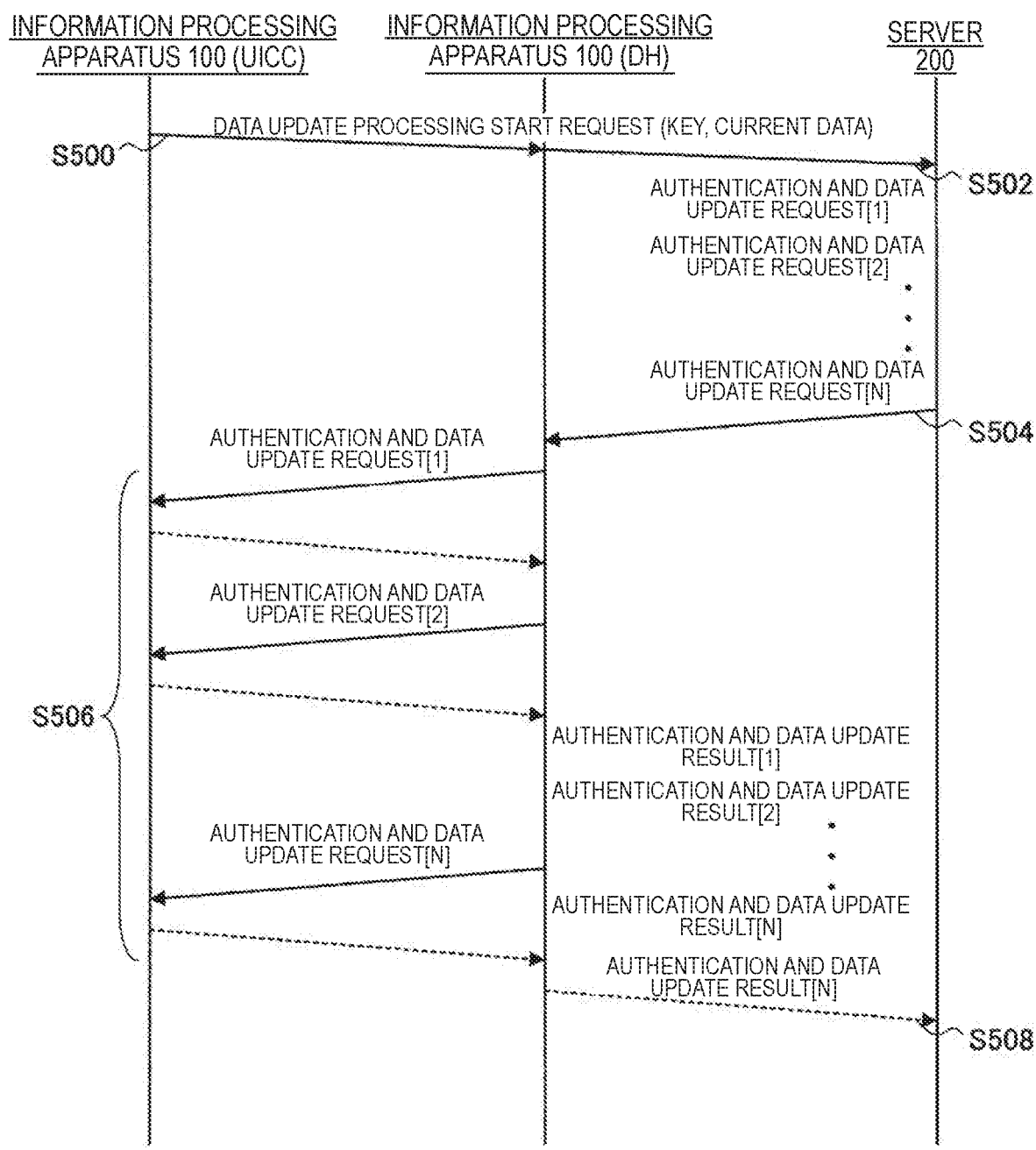

INFORMATION PROCESSING APPARATUS AND INFORMATION PROCESSING METHOD

CROSS REFERENCE TO PRIOR APPLICATION

This application is a National Stage Patent Application of PCT International Patent Application No. PCT/JP2017/040480 (filed on Nov. 9, 2017) under 35 U.S.C. § 371, which claims priority to Japanese Patent Application No. 2016-239379 (filed on Dec. 9, 2016), which are all hereby incorporated by reference in their entirety.

TECHNICAL FIELD

The present disclosure relates to an information processing apparatus and an information processing method.

BACKGROUND ART

A technology relating to mutual authentication has been developed. As the above-described technology, there is, for example, a technology disclosed in the following Patent Literature 1.

CITATION LIST

Patent Literature

Patent Literature 1: JP H10-20780A

DISCLOSURE OF INVENTION

Technical Problem

In the case where information (data) is updated through communication between one apparatus and another apparatus, for example, to prevent unauthorized information update, information is updated after mutual authentication is performed. However, in the case where information is updated by utilizing an existing technology such as, for example, the technology disclosed in Patent Literature 1, the information cannot be securely updated unless after both the above-described one apparatus and the above-described other apparatus which perform processing relating to update of the information receive authentication results of each other. Therefore, in the case where the existing technology is utilized, it is necessary to perform communication relating to mutual authentication and communication relating to update of the information between the above-described one apparatus and the above-described other apparatus which perform the processing relating to update of the information.

The present disclosure proposes a new and improved information processing apparatus and information processing method which can reduce the number of times of communication to be performed between apparatuses in the case where information is securely updated through communication between the apparatuses.

Solution to Problem

According to the present disclosure, there is provided an information processing apparatus including: a processing unit configured to execute processing of authenticating an external apparatus through communication with the external apparatus which is a communication target and processing of updating information to be updated through communication with the external apparatus, as a series of processing.

In addition, according to the present disclosure, there is provided an information processing apparatus including: a processing unit configured to execute processing of authenticating an external apparatus through communication with the external apparatus which is a communication target, and processing of updating information to be updated at the external apparatus through communication with the external apparatus, as a series of processing.

In addition, according to the present disclosure, there is provided an information processing method to be executed by an information processing apparatus, the information processing method including: a step of executing processing of authenticating an external apparatus through communication with the external apparatus which is a communication target, and processing of updating information to be updated through communication with the external apparatus, as a series of processing.

In addition, according to the present disclosure, there is provided an information processing method to be executed by an information processing apparatus, the information processing method including: a step of executing processing of authenticating an external apparatus through communication with the external apparatus which is a communication target, and processing of updating information to be updated at the external apparatus through communication with the external apparatus, as a series of processing.

Advantageous Effects of Invention

According to the present disclosure, it is possible to reduce the number of times of communication to be performed between apparatuses in the case where information is securely updated through communication between the apparatuses.

Note that the effects described above are not necessarily limitative. With or in the place of the above effects, there may be achieved any one of the effects described in this specification or other effects that may be grasped from this specification.

BRIEF DESCRIPTION OF DRAWINGS

FIG. 9 is an explanatory diagram illustrating an example of processing relating to an information processing method according to a second embodiment.

MODE(S) FOR CARRYING OUT THE INVENTION

Figure 1:
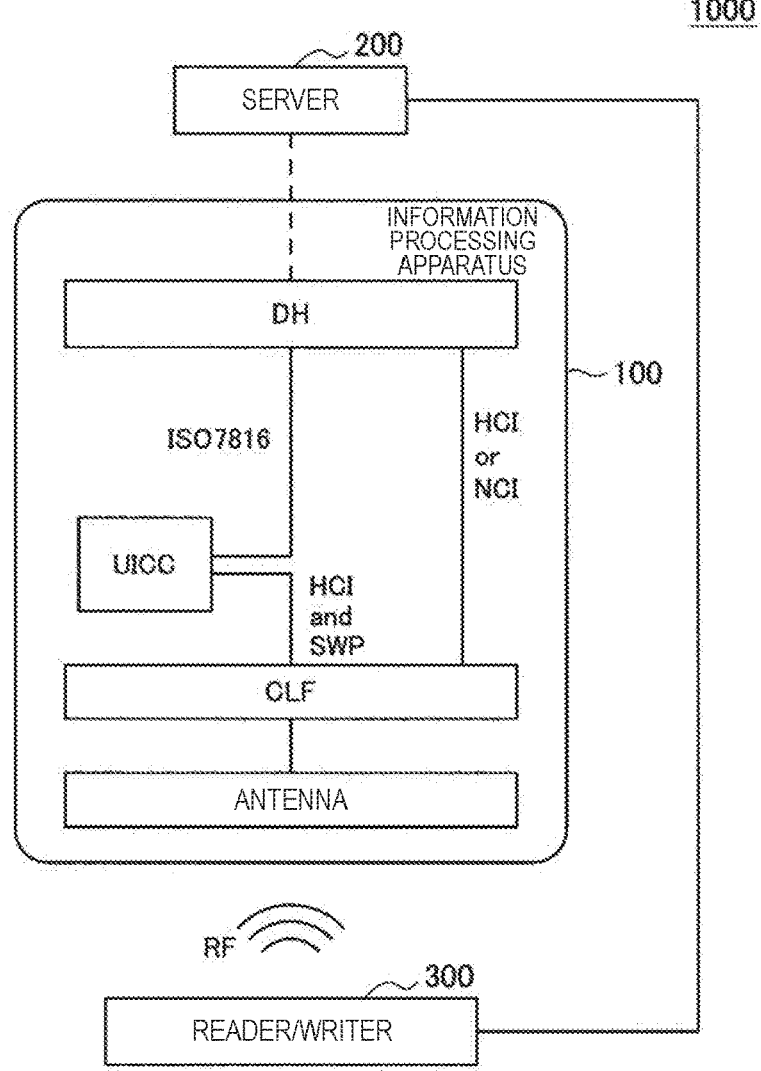
FIG. 1 is an explanatory diagram illustrating an example of a configuration of an information processing system according to the present embodiment.

Hereinafter, (a) preferred embodiment(s) of the present disclosure will be described in detail with reference to the appended drawings. Note that, in this specification and the appended drawings, structural elements that have substantially the same function and structure are denoted with the same reference numerals, and repeated explanation of these structural elements is omitted.

Further, description will be provided below in the following order.
1. Information processing system according to the present embodiment, and information processing method according to the present embodiment
2. Program according to the present embodiment
(Information Processing System According to the Present Embodiment, and Information Processing Method According to the Present Embodiment)

An information processing method according to the present embodiment will be described below using an example in the case where the information processing method is applied to an information processing system according to the present embodiment after an example of the information processing system according to the present embodiment is described.

[1] Information Processing System According to the Present Embodiment

FIG. 1 is an explanatory diagram illustrating an example of a configuration of an information processing system 100 according to the present embodiment. The information processing system 1000 includes, for example, an information processing apparatus 100 (first information processing apparatus) and a server 200 (second information processing apparatus).

The information processing apparatus 100 and the server 200, for example, perform communication via a network (or directly).

Examples of the network according to the present embodiment can include, for example, a wired network such as a local area network (LAN) and a wide area network (WAN), a wireless network such as a wireless local area network (WLAN), the Internet using communication protocol such as transmission control protocol/internet protocol (TCP/IP), or the like.

Further, FIG. 1 also illustrates a reader/writer 300 which can perform non-contact communication with the information processing apparatus 100.

Examples of the non-contact communication according to the present embodiment can include, for example, near fired communication (NFC) specified in ISO/IEC 18092. In NFC, for example, communication is performed using a magnetic field (carrier) of a predetermined frequency such as 13.56 [MHz]. In the following description, an example of a case where the non-contact communication according to the present embodiment is NFC will be described.

In the information processing system 1000 illustrated in FIG. 1, the information processing apparatus 100 and the server 200 may be able to perform communication via the reader/writer 300.

Note that the information processing system according to the present embodiment is not limited to an example illustrated in FIG. 1.

For example, the information processing system according to the present embodiment can employ a configuration where the reader/writer 300 illustrated in FIG. 1 is not provided.

Further, the information processing system according to the present embodiment may include a plurality of information processing apparatuses 100. In the case where the information processing system according to the present embodiment includes a plurality of information processing apparatuses 100, the server 200, for example, performs communication individually (independently) with each of the plurality of information processing apparatuses 100.

[1-1] Information Processing Apparatus 100 (First Information Processing Apparatus)

Figure 2:
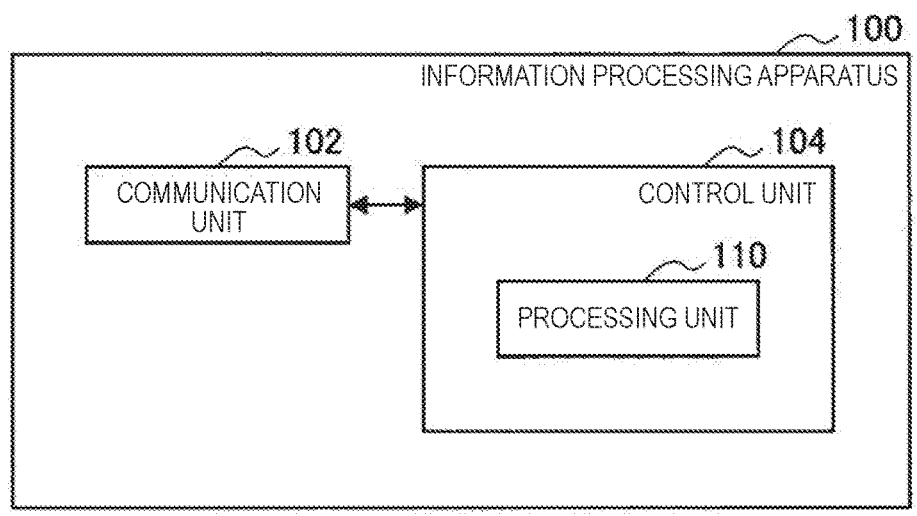
FIG. 2 is a block diagram illustrating an example of a configuration of an information processing apparatus (first information processing apparatus) according to the present embodiment.

FIG. 2 is a block diagram illustrating an example of a configuration of the information processing apparatus 100 (first information processing apparatus) according to the present embodiment. The information processing apparatus 100 includes, for example, a communication unit 102 and a control unit 104.

Further, the information processing apparatus 100 may include, for example, a read only memory (ROM, not illustrated), a random access memory (RAM, not illustrated), a storage unit (not illustrated), an operating unit (not illustrated) which can be operated by a user of the information processing apparatus 100, a display unit (not illustrated) which displays various screens on a display screen, or the like. In the information processing apparatus 100, for example, the above-described respective components are connected with a bus as a data transmission path.

The ROM (not illustrated) stores data for control such as programs and operation parameters to be used by the control unit 104. The RAM (not illustrated) temporarily stores programs, or the like, to be executed by the control unit 104.

The storage unit (not illustrated), which is storage means provided at the information processing apparatus 100, stores various kinds of data such as, for example, data relating to the information processing method according to the present embodiment to be applied to the information processing apparatus 100 and various kinds of application. Here, examples of the storage unit (not illustrated) can include, for example, a magnetic recording medium such as a hard disk, a non-volatile memory such as a flash memory, or the like. Further, the storage unit (not illustrated) may be detachable from the information processing apparatus 100.

Examples of the operating unit (not illustrated) can include, for example, a button, a direction key, a rotary selector such as a jog dial, combination thereof, or the like. Further, examples of the display unit (not illustrated) can include, for example, a liquid crystal display, an organic electro-luminescence (EL) display (which is also called an organic light emitting diode (OLED) display), or the like.

[Hardware Configuration Example of Information Processing Apparatus 100]

For example, as illustrated in FIG. 1, the information processing apparatus 100 includes a universal integrated circuit card (UICC), a contactless front end (CLF), an antenna and a device host (DH). The information processing apparatus 100 is driven by, for example, power supplied from an internal power supply such as a battery provided at the information processing apparatus 100, power supplied from a connected external power supply, or the like.

FIG. 1 illustrates an example where, for example, the UICC and the CLF perform communication via a communication interface called a host controller interface (HC1) and single wire protocol (SWP), and the UICC and the DH perform communication via a communication interface based on, for example, ISO7816 standards. That is, FIG. 1 illustrates an example where the UICC performs communication respectively with the CLF and the DH using two different communication paths.

Further, FIG. 1 illustrates an example where the CLF and the DH perform communication via the HCI or NFC controller interface (NCI).

Note that the communication interface between the UICC, and the CLF and the DH is not limited to the above-described examples. For example, the UICC and the CLF may perform communication via a communication interface called dual wire protocol (DWP) in place of the SWP illustrated in FIG. 1. For example, the DH and the UICC can indirectly perform contact communication via other components as DH-CLF-UICC.

The UICC, for example, plays a leading role of performing processing relating to the information processing method according to the present embodiment at the information processing apparatus 100. The processing relating to the information processing method according to the present embodiment at the information processing apparatus 100 will be described later.

The UICC includes, for example, one, or two or more processors constituted with arithmetic circuits such as micro processing units (MPUs), which play a leading role of performing the processing relating to the information processing method according to the present embodiment at the information processing apparatus 100 which will be described later.

Further, the UICC may include a recording medium which can store various kinds of data such as, for example, electronic value (money or data having value based on money) and application. The recording medium provided at the UICC has, for example, tamper-resistance. That is, the UICC may be a secure element.

For example, information stored in the recording medium provided at the UICC corresponds to an example of information to be updated (hereinafter, referred to as "information to be updated") through communication between the information processing apparatus 100 and the server 200.

The UICC, for example, performs communication with the server 200 through communication via the DH. Further, the UICC, for example, performs communication with the reader/writer 300 through non-contact communication via the CLF and the antenna, and performs communication with the server 200 via the reader/writer 300. Note that the UICC and the server 200 can, for example, also perform communication via a contact reader/writer (not illustrated) which performs contact communication with the UICC.

Note that a component which can play a leading role of performing the processing relating to the information processing method according to the present embodiment at the information processing apparatus 100 which will be described later is not limited to the UICC. For example, the component which can play a leading role of performing the processing relating to the information processing method according to the present embodiment at the information processing apparatus 100 which will be described later may be a "subscriber identity module (SIM)", "eUICC (in the case where the UICC illustrated in FIG. 1 is not detachable)", "eSE" (in the case where the UICC illustrated in FIG. 1 is not detachable and does not store information required for connection with a typical public wireless line), or the like.

The CLF corresponds to a non-contact communication device which can perform non-contact communication with external apparatuses, and is connected to an antenna for non-contact communication. Note that the antenna may be provided at the CLF.

The CLF, for example, receives a carrier by the connected antenna, demodulates the signal, and responds to the external apparatus via the antenna by performing load modulation.

The DH includes, for example, one, or two or more processors constituted with arithmetic circuits such as MPUs. The processor provided at the DH performs various kinds of processing by executing middleware or application. Here, the processor provided at the DH corresponds to an external processor from the viewpoint of the UICC.

Further, the DH includes, for example, a communication device, and performs communication with external apparatuses such as the server 200 using the communication device. Note that the DH can perform communication with the external apparatuses such as the server 200 using a connected external communication device.

Examples of the communication device provided at the DH or the communication device connected to the DH can include, for example, a communication antenna and a radio frequency (RF) circuit (wireless communication), an IEEE802.15.1 port and a transmission/reception circuit (wireless communication), an IEEE802.11 port and a transmission/reception circuit (wireless communication), a LAN terminal and a transmission/reception circuit (wired communication), or the like.

The information processing apparatus 100, for example, includes the hardware configuration illustrated in FIG. 1.

Note that the hardware configuration of the information processing apparatus according to the present embodiment is not limited to the configuration illustrated in FIG. 1.

For example, the UICC and the CLF illustrated in FIG. 1 may be constituted with one hardware.

Further, for example, in the case where the UICC is connected to an external non-contact device which has functions similar to those of the CLF, the information processing apparatus according to the present embodiment does not have to include the CLF illustrated in FIG. 1.

Further, the information processing apparatus according to the present embodiment may employ a hardware configuration (including modified examples) similar to that of, for example, the server 200 which will be described later. In the case where the information processing apparatus according to the present embodiment employs a hardware configuration (including modified examples) similar to that of, for example, the server 200 which will be described later, for example, the processor (for example, an MPU 250 which will be described later) constituting the information processing apparatus according to the present embodiment plays a leading role of performing the processing relating to the information processing method according to the present embodiment at the information processing apparatus 100 which will be described later.

An example of a case where the information processing apparatus according to the present embodiment is the information processing apparatus 100 having the hardware configuration illustrated in FIG. 1 will be described below.

Returning to FIG. 2 again, an example of a configuration of the information processing apparatus 100 will be described. The communication unit 102, which is communication means provided at the information processing apparatus 100, performs wireless or wired communication with external apparatuses such as the server 200 via a network (or directly). Further, communication performed by the communication unit 102 is controlled by, for example, the control unit 104.

Here, while examples of the communication unit 102 can include, for example, the communication antenna and the RF circuit, the LAN terminal and the transmission/reception circuit, or the like, the configuration of the communication unit 102 is not limited to the above. For example, the communication unit 102 may employ a configuration supporting arbitrary standards which enable communication of a universal serial bus (USB) terminal and a transmission/reception circuit, or the like, or an arbitrary configuration which enables communication with external apparatuses via a network. Further, the communication unit 102 may employ a configuration which enables communication with one, or two or more external apparatuses, or the like, using a plurality of communication schemes.

The control unit 104, which is constituted with, for example, MPUs, plays a role of controlling the whole information processing apparatus 100. Further, the control unit 104 includes, for example, a processing unit 110, and plays a leading role of performing the processing relating to the information processing method according to the present embodiment at the information processing apparatus 100 which will be described later.

The processing unit 10 plays a leading role of performing processing relating to the information processing method according to the present embodiment at the information processing apparatus 100. An example of the processing relating to the information processing method according to the present embodiment at the information processing apparatus 100 will be described later.

Note that the configuration of the information processing apparatus (first information processing apparatus) according to the present embodiment is not limited to the configuration illustrated in FIG. 2.

For example, the information processing apparatus according to the present embodiment can include the processing unit 110 illustrated in FIG. 2 separately from the control unit 104 (for example, the processing unit 110 can be implemented with another processing circuit).

Further, the configuration of the information processing apparatus according to the present embodiment is not limited to the configuration illustrated in FIG. 2, and can be a configuration in accordance with a way of separating the processing relating to the information processing method according to the present embodiment at the information processing apparatus 100 which will be described later.

Further, for example, in the case where communication is performed with external apparatuses via an external communication device having functions and a configuration similar to those of the communication unit 102, the information processing apparatus according to the present embodiment does not have to include the communication unit 102.

Further, the information processing apparatus according to the present embodiment may, for example, further include a non-contact communication unit (not illustrated) for performing non-contact communication. Examples of the non-contact communication unit (not illustrated) can include, for example, the CLF and an antenna.

[1-2] Server 200 (Second Information Processing Apparatus)

Figure 3:
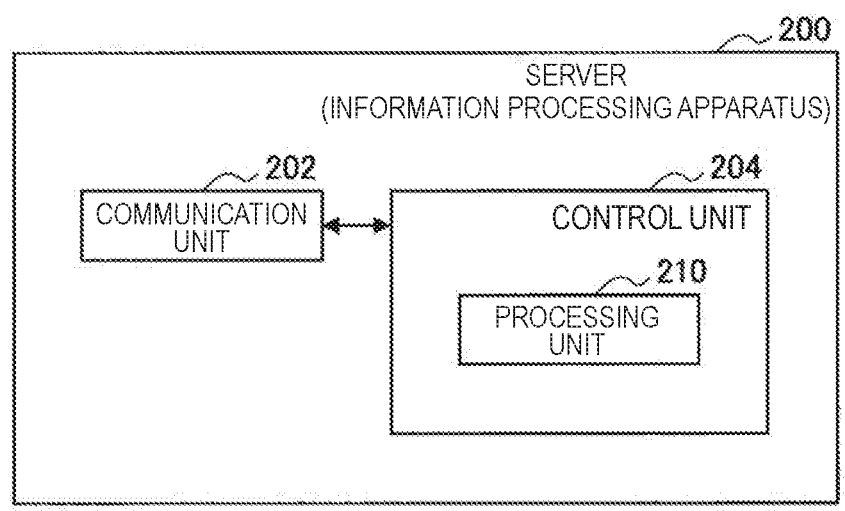
FIG. 3 is a block diagram illustrating an example of a configuration of a server (second information processing apparatus) according to the present embodiment.

FIG. 3 is a block diagram illustrating an example of a configuration of the server 200 (second information processing apparatus) according to the present embodiment. The server 200 includes, for example, a communication unit 202 and a control unit 204.

Further, the server 200 may include, for example, a ROM (not illustrated), a RAM (not illustrated), a storage unit (not illustrated), an operating unit (not illustrated) which can be operated by a user of the server 200, a display unit (not illustrated) which displays various screens on a display screen, or the like. In the server 200, for example, the above-described respective components are connected with a bus as a data transmission path.

The ROM (not illustrated) stores data for control such as programs and operation parameters to be used by the control unit 204. The RAM (not illustrated) temporarily stores programs, or the like, to be executed by the control unit 204.

The storage unit (not illustrated), which is storage means provided at the server 200, stores various kinds of data such as, for example, data relating to the information processing method according to the present embodiment to be applied to the server 200 and various kinds of application. Here, examples of the storage unit (not illustrated) can include, for example, a magnetic recording medium such as a hard disk, a non-volatile memory such as a flash memory, or the like. Further, the storage unit (not illustrated) may be detachable from the server 200.

Examples of the operating unit (not illustrated) can include an operation input device illustrated in a hardware configuration example of the server 200 which will be described later. Further, examples of the display unit (not illustrated) can include a display device illustrated in the hardware configuration example of the server 200 which will be described later.

[Hardware Configuration Example of Server 200]

Figure 4:
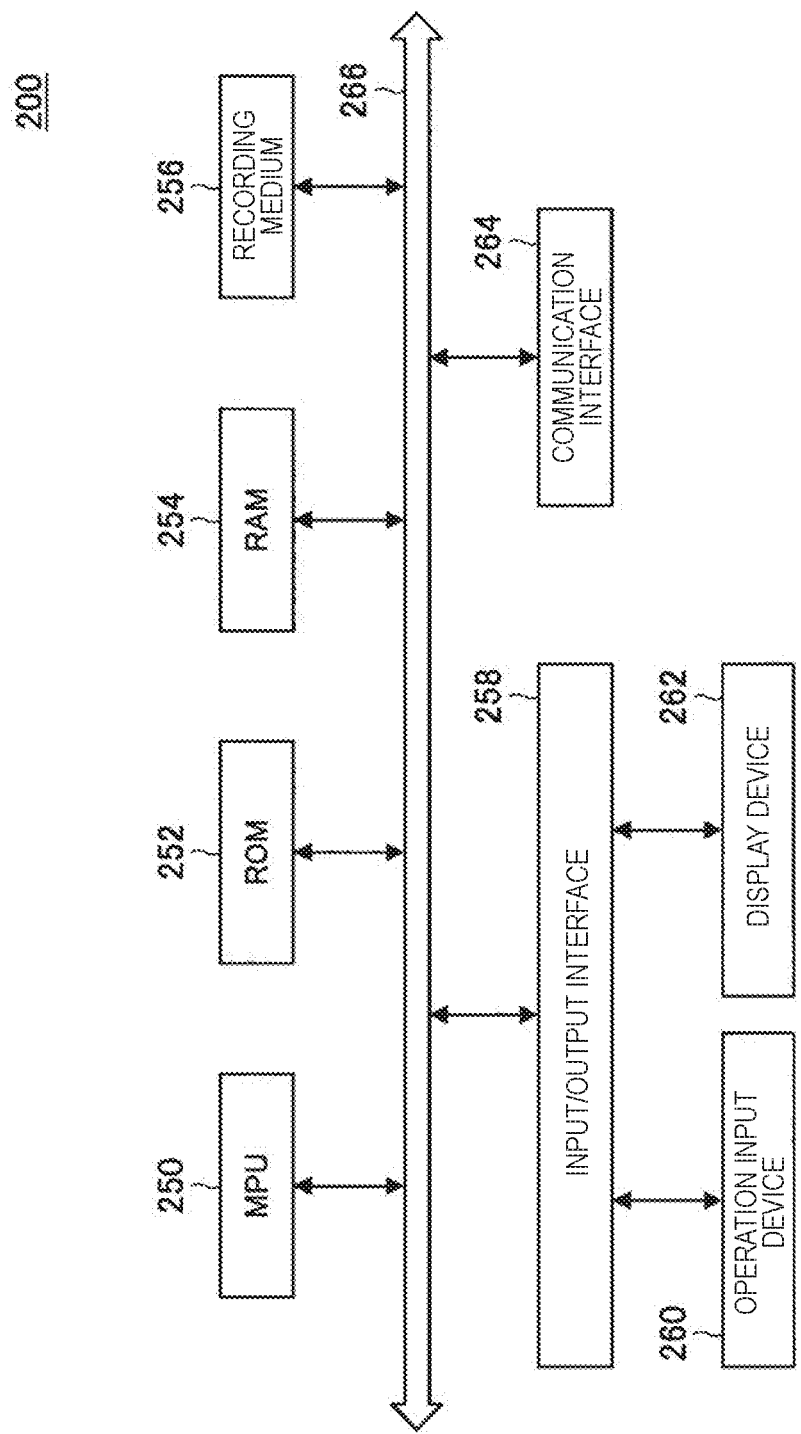
FIG. 4 is an explanatory diagram illustrating an example of a hardware configuration of the server (second information processing apparatus) according to the present embodiment.

FIG. 4 is an explanatory diagram illustrating an example of a hardware configuration of the server 200 (second information processing apparatus) according to the present embodiment. The server 200 includes, for example, an MPU 250, a ROM 252, a RAM 254, a recording medium 256, an input/output interface 258, an operation input device 260, a display device 262 and a communication interface 264. Further, in the server 200, for example, respective components are connected with a bus 266 as a data transmission path. Further, the server 200 is driven by, for example, power supplied from an internal power supply such as a battery provided at the server 200, power supplied from a connected external power supply, or the like.

The MPU 250 includes, for example, one, or two or more processors constituted with arithmetic circuits such as MPUs, various kinds of processing circuits, or the like, and functions as a control unit 204 which controls the whole server 200. Further, the MPU 250 plays a role of, for example, a processing unit 210 which will be described later, at the server 200. Note that the processing unit 210 may be constituted with dedicated (or general-purpose) circuits (such as, for example, processors separate from the MPU 250).

The ROM 252 stores data for control, or the like, such as programs and operation parameters to be used by the MPU 250. The RAM 254 temporarily stores programs, or the like, to be executed by the MPU 250.

The recording medium 256 functions as a storage unit (not illustrated) and stores various kinds of data such as, for example, data relating to the information processing method according to the present embodiment applied to the server 200 and various kinds of application. Here, examples of the recording medium 256 can include, for example, a magnetic recording medium such as a hard disk, and a non-volatile memory such as a flash memory. Further, the recording medium 256 may be detachable from the server 200.

The input/output interface 258 connects, for example, the operation input device 260 and the display device 262. The operation input device 260 functions as an operating unit (not illustrated), and the display device 262 functions as a display unit (not illustrated). Here, examples of the input/output interface 258 can include, for example, a USB terminal, a digital visual interface (DVI) terminal, a high-definition multimedia interface (HDMI) (registered trademark) terminal, various kinds of processing circuits, or the like.

Further, the operation input device 260 is, for example, provided on the server 200, and is connected to the input/output interface 258 inside the server 200. Examples of the operation input device 260 can include, for example, a button, a direction key, a rotary selector such as a jog dial, combination thereof, or the like.

Further, the display device 262 is, for example, provided on the server 200, and is connected to the input/output interface 258 inside the server 200. Examples of the display device 262 can include, for example, a liquid crystal display, an organic EL display, or the like.

Note that it goes without saying that the input/output interface 258 can be connected to external devices such as operation input devices (such as, for example, a keyboard and a mouse) and display devices outside the server 200. Further, the display device 262 may be a device which enables display and user operation, such as, for example, a touch panel.

The communication interface 264, which is communication means provided at the server 200, functions as the communication unit 202 for performing wireless or wired communication with external apparatuses such as the reader/writer 300 via a network (or directly). Here, examples of the communication interface 264 can include, for example, a communication antenna and an RF circuit (wireless communication), an IEEE802.15.1 port and a transmission/reception circuit (wireless communication), an IEEE802.11 port and a transmission/reception circuit (wireless communication), a LAN terminal and a transmission/reception circuit (wired communication), or the like. Further, the communication interface 264 may employ an arbitrary configuration supporting the network according to the present embodiment.

The server 200 performs processing relating to the information processing method according to the present embodiment at the server 200 which will be described later with, for example, the configuration illustrated in FIG. 4. Note that the hardware configuration of the server 200 according to the present embodiment is not limited to the configuration illustrated in FIG. 4.

For example, in the case where the server 200 performs communication with external apparatuses, or the like, via a connected external communication device, the server 200 does not have to include the communication interface 264. Further, the communication interface 264 may employ a configuration which enables communication with one, or two or more external apparatuses, or the like, using a plurality of communication schemes.

Further, the server 200 can, for example, employ a configuration which does not include the recording medium 256, the operation input device 260 and the display device 262.

Further, the server 200 can, for example, employ a configuration in accordance with application examples of the server 200 which will be described later.

Further, for example, part or all of the components illustrated in FIG. 4 (or components according to modified examples) may be implemented with one, or two or more integrated circuits (ICs).

Returning to FIG. 3 again, an example of a configuration of the server 200 will be described. The communication unit 202, which is communication means provided at the server 200, performs wireless or wired communication with external apparatuses such as the reader/writer 300 via a network (or directly). Further, communication performed by the communication unit 202 is controlled by, for example, the control unit 204.

Here, while examples of the communication unit 202 can include, for example, the communication antenna and the RF circuit, the LAN terminal and the transmission/reception circuit, or the like, the configuration of the communication unit 202 is not limited to the above. For example, the communication unit 202 may employ a configuration supporting arbitrary standards which enable communication of a USB terminal and a transmission/reception circuit, or the like, or an arbitrary configuration which enables communication with external apparatuses via a network. Further, the communication unit 202 may employ a configuration which enables communication with one, or two or more external apparatuses, or the like, using a plurality of communication schemes.

The control unit 204, which is constituted with, for example, MPUs, plays a role of controlling the whole server 200. Further, the control unit 204 includes, for example, a processing unit 210, and plays a leading role of performing the processing relating to the information processing method according to the present embodiment at the server 200 which will be described later.

The processing unit 210 plays a leading role of performing processing relating to the information processing method according to the present embodiment at the server 200. An example of the processing relating to the information processing method according to the present embodiment at the server 200 will be described later.

Note that the configuration of the server (second information processing apparatus) according to the present embodiment is not limited to the configuration illustrated in FIG. 3.

For example, the server according to the present embodiment can include the processing unit 210 illustrated in FIG. 3 separately from the control unit 204 (for example, the processing unit 110 can be implemented with another processing circuit).

Further, the configuration of the server according to the present embodiment is not limited to the configuration illustrated in FIG. 3, and can be a configuration in accordance with a way of separating the processing relating to the information processing method according to the present embodiment at the server 200 which will be described later.

Further, for example, in the case where communication is performed with external apparatuses via an external communication device having functions and a configuration similar to those of the communication unit 202, the information processing apparatus according to the present embodiment does not have to include the communication unit 202.

[1-3] Application Examples of Respective Apparatuses Constituting Information Processing System According to the Present Embodiment While the information processing apparatus 100 (first information processing apparatus) has been described above as a component of the information processing system according to the present embodiment, the present embodiment is not limited to such a form. The present embodiment can be applied to various kinds of equipment such as, for example, a "communication apparatus such as a smartphone", an "IC card", a "computer such as a personal computer (PC)", a "tablet apparatus" and "game machine", which can perform the processing relating to the information processing method according to the present embodiment at the information processing apparatus 100 which will be described later. Further, the present embodiment can be also applied to, for example, processing ICs which can be incorporated into the equipment as described above.

Further, while the server 200 (second information processing apparatus) has been described as a component of the information processing system according to the present embodiment, the present embodiment is not limited to such a form. The present embodiment can be applied to various kinds of equipment such as, for example, a "computer such as a PC and a server", a "tablet apparatus" and a "communication apparatus such as a smartphone", which can perform the processing relating to the information processing method according to the present embodiment at the server 200 which will be described later. Further, the present embodiment can be also applied to, for example, processing ICs which can be incorporated into the equipment as described above.

Further, the server 200 according to the present embodiment may be applied to a processing system assuming connection to a network (or communication between respective apparatuses) as in, for example, cloud computing. An example of the above-described processing system can be, for example, a "system in which part of the processing relating to the information processing method according to the present embodiment at the server 200 which will be described later is performed by one apparatus constituting the processing system, and processing other than the part of the processing relating to the information processing method according to the present embodiment is performed by another apparatus constituting the processing system", or the like.

[2] Information Processing Method According to the Present Embodiment

The processing relating to the information processing method according to the present embodiment will be described next using an example of communication between the information processing apparatus 100 and the server 200 in the information processing system 1000 described above.

In the following description, there is a case where "information" is expressed as "data", for example, "update of information" being expressed as "update of data".

[2-1] Outline of Information Processing Method According to the Present Embodiment As described above, in the case where information is updated by utilizing an existing technology, the information cannot be securely updated unless after both the above-described one apparatus and the above-described other apparatus which perform processing relating to update of the information receive authentication results of each other.

Figure 5:
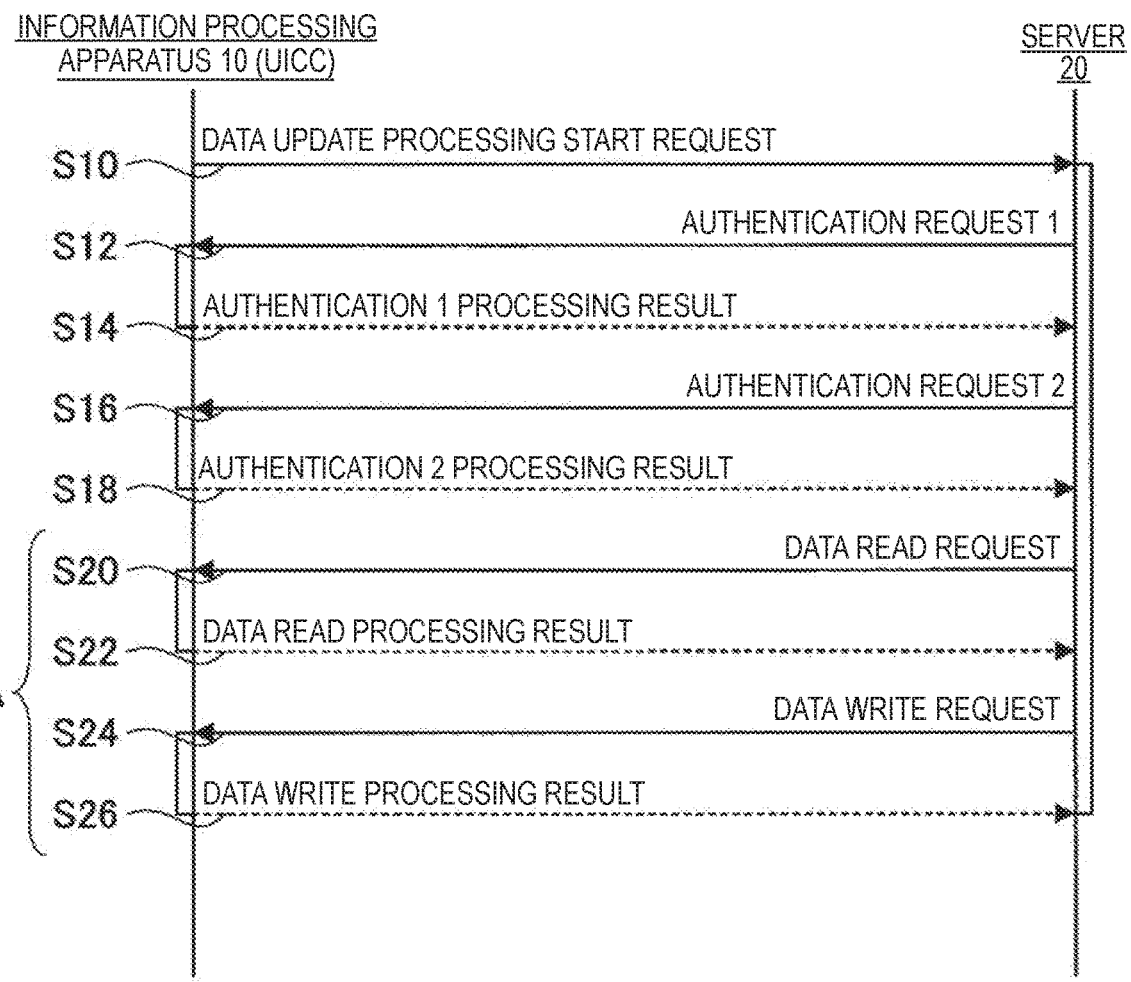
FIG. 5 is an explanatory diagram illustrating an example of communication in the case where information is updated by utilizing an existing technology.

FIG. 5 is an explanatory diagram illustrating an example of communication in the case where information is updated by utilizing an existing technology. FIG. 5 illustrates an example of communication between the information processing apparatus 10 (the UICC provided at the information processing apparatus 10) and the server 20 which constitute an information processing system having a configuration similar to that of the information processing system 1000 illustrated in FIG. 1.

The information processing apparatus 10 transmits a data update processing start request including a data update processing start command (S10).

The server 20 which receives the data update processing start request transmitted from the information processing apparatus 10 in step S10 transmits an authentication request 1 (authentication request for authenticating the information processing apparatus 10) (S12).

The information processing apparatus 10 which receives the authentication request 1 transmitted from the server 20 in step S12 performs authentication processing on the basis of the authentication request 1 and transmits an authentication 1 processing result which is an authentication result in response to the authentication request 1 (S14).

The server 20 which receives the authentication 1 processing result transmitted from the information processing apparatus 10 in step S14 generates an authentication request 2 (authentication request for authenticating the server 20) using the authentication 1 processing result and transmits the generated authentication request 2 (S16).

The information processing apparatus 10 which receives the authentication request 2 transmitted from the server 20 in step S16 performs authentication processing on the basis of the authentication request 2 and transmits an authentication 2 processing result which is an authentication result in response to the authentication request 2 (S18).

Through processing from step S12 to S18, a state where both the information processing apparatus 10 and the server 20 receive authentication results of each other is realized. A session is established between the information processing apparatus 10 and the server 20 in communication in step S20 and subsequent step illustrated in A in FIG. 5, so that processing relating to other communication is excluded.

The server 20 which receives the authentication 2 processing result transmitted from the information processing apparatus 10 in step S18 generates various kinds of requests relating to reading and writing of data to be transmitted thereafter, using the authentication 2 processing result and transmits the generated requests (S20, S24).

Further, the information processing apparatus 10 which receives the requests transmitted from the server 20 respectively in step S20 and S24 performs processing in accordance with the received requests, and transmits processing results (S22, S26).

Through the processing from step S20 to S26, secure update of information can be realized between the information processing apparatus 10 and the server 20.

For example, as illustrated in FIG. 1, in the case where the existing technology is used, information cannot be securely updated unless after both the information processing apparatus 10 and the server 20 receive authentication results of each other. Therefore, as described above, in the case where the existing technology is used, it is necessary to perform communication relating to mutual authentication and communication relating to update of the information between the information processing apparatus 10 and the server 20.

Therefore, in the information processing system 1000 according to the present embodiment, both the information processing apparatus 100 and the server 200 execute processing of authenticating an external apparatus through communication with the external apparatus which is a communication target and processing of updating information to be updated through communication with the external apparatus as a series of processing. In the following description, there is a case where the processing of authenticating an external apparatus through communication with the external apparatus which is a communication target may be referred to as "authentication processing", and the processing of updating information to be updated through communication with the external apparatus may be referred to as "information update processing".

Here, examples of the external apparatus which is a communication target in the information processing system 1000 can include, for example, the server 200 from a viewpoint of the information processing apparatus 100, and the information processing apparatus 100 from a viewpoint of the server 200.

Further, the information to be updated according to the present embodiment can include, for example, information stored in a recording medium provided at the information processing apparatus 100, such as a recording medium provided at the UICC constituting the information processing apparatus 100. Further, the information to be updated according to the present embodiment may be information stored in an external recording medium connected to the information processing apparatus 100.

More specifically, the information processing apparatus 100 executes processing of authenticating the server 200) through communication with the server 200 (external apparatus which is a communication target) and processing of updating information to be updated through communication with the server 200 as a series of processing.

Further, the server 200 executes processing of authenticating the information processing apparatus 100 through communication with the information processing apparatus 100 (external apparatus which is a communication target) and processing of updating information to be updated at the information processing apparatus 100 through communication with the information processing apparatus 100 as a series of processing.

Figure 6:
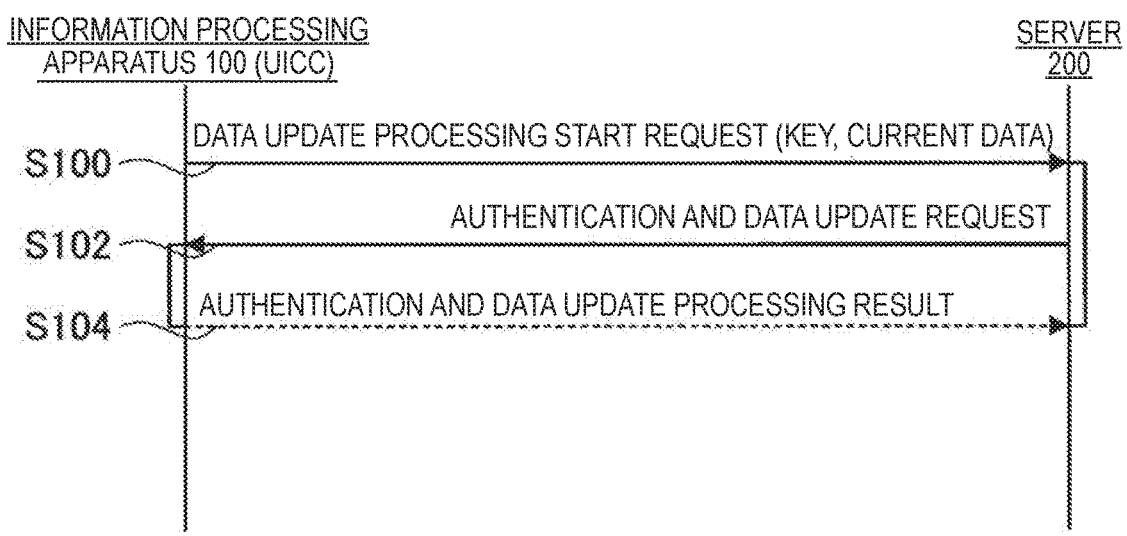
FIG. 6 is a flowchart illustrating an example of communication in the case where information is updated by utilizing an information processing method according to the present embodiment.

FIG. 6 is a flowchart illustrating an example of communication in the case where information is updated by utilizing the information processing method according to the present embodiment.

The information processing apparatus 100 transmits a data update processing start request including a data update processing start command, information required for data update and information required for encrypting and decrypting the information (S100).

The server 200 which receives the data update processing start request transmitted from the information processing apparatus 100 in step S100 transmits an authentication and data update request on the basis of the information required for data update and the information required for encrypting and decrypting the information (S102).

The information processing apparatus 100 which receives the authentication and data update request transmitted from the server 200 in step S102, performs authentication processing and data update processing and transmits a processing result (S104).

For example, as illustrated in FIG. 6, by the information processing apparatus 100 transmitting the "data update processing start request including the information required for data updating and the information required for encrypting and decrypting the information", the authentication processing and the information update processing are executed as a series of processing in the information processing system 1000.

Further, as a result of the authentication processing and the information update processing being executed as a series of processing, for example, as illustrated in FIG. 6, information can be securely updated in the information processing system 1000 through three types of transaction of "transmission of the data update start request from the information processing apparatus 100 to the server 200", "transmission of the authentication and data update request from the server 200 to the information processing apparatus 100" and "transmission of the processing result from the information processing apparatus 100 to the server 200".

Therefore, by the information processing method according to the present embodiment being used, it is possible to reduce the number of times of communication (the number of times of transaction) between the information processing apparatus 100 and the server 200 compared to a case where the existing technology illustrated in FIG. 5 is used.

Note that an example of communication in the case where information is updated by utilizing the information processing method according to the present embodiment is not limited to the example illustrated in FIG. 6.

Figure 7:
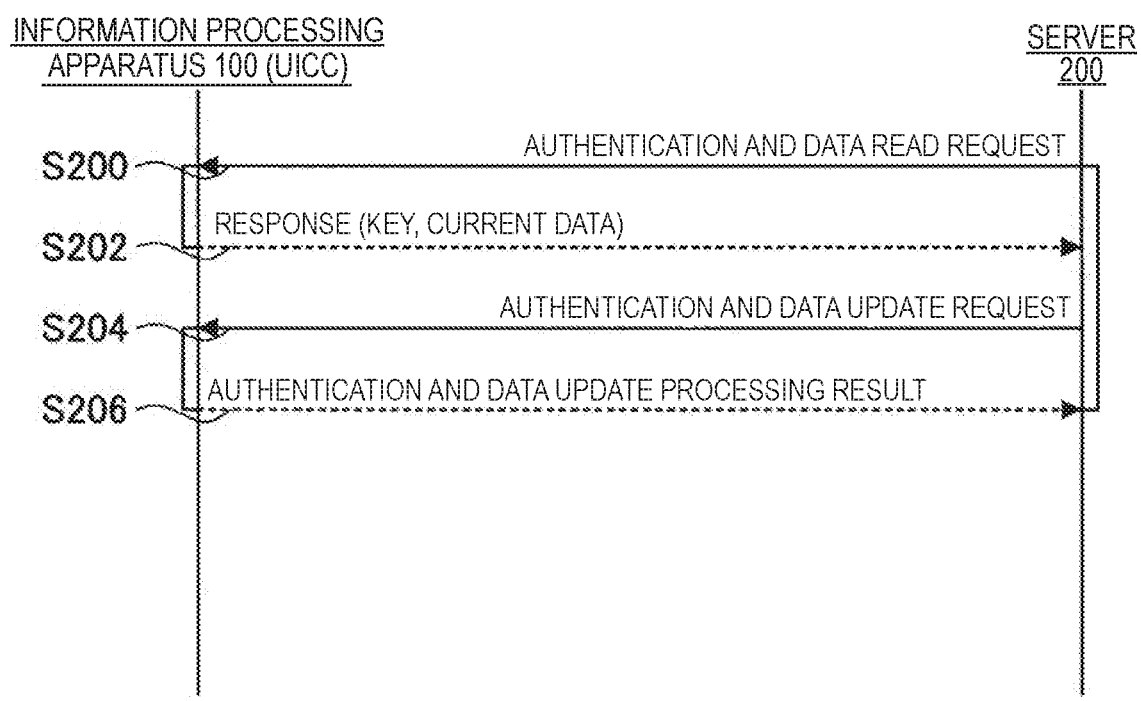
FIG. 7 is an explanatory diagram illustrating another example of the communication in the case where information is updated by utilizing the information processing method according to the present embodiment.

FIG. 7 is an explanatory diagram illustrating another example of communication in the case where information is updated by utilizing the information processing method according to the present embodiment.

The server 200 transmits a data update processing start request including a data update processing start command (S200).

The information processing apparatus 10 which receives the data update processing start request transmitted from the server 200 in step S200, transmits a response signal including information required for data update and information required for encrypting and decrypting the information (S202).

The server 200 which receives the response signal transmitted from the information processing apparatus 100 in step S202, transmits an authentication and data update request on the basis of the information required for data update and the information required for encrypting and decrypting the information (S204).

The information processing apparatus 100 which receives the authentication and data update request transmitted from the server 200 in step S204, performs authentication processing and data update processing and transmits a processing result (S206).

For example, as illustrated in FIG. 7, the authentication processing and the information update processing may be executed as a series of processing in the information processing system 1000 by the data update processing start request including the data update processing start command being transmitted from the server 200 to the information processing apparatus 100.

That is, the authentication processing and the information update processing are executed as a series of processing in the information processing system 1000 by being triggered by the processing start request transmitted by the information processing apparatus 100 (FIG. 6) or by being triggered by the processing start request transmitted by the server 200 (FIG. 7).

Even in the case where the processing illustrated in FIG. 7 is performed as the processing relating to the information processing method according to the present embodiment, it is possible to reduce the number of times of communication between the information processing apparatus 100 and the server 200 compared to a case where the existing technology illustrated in FIG. 5 is used.

For example, as illustrated in FIG. 6 and FIG. 7, by the authentication processing and the information update processing being executed as a series of processing respectively at the information processing apparatus 100 and the server 200, in the case where information is securely updated through communication between apparatuses, it is possible to reduce the number of times of communication to be performed between the apparatuses.

Further, as a result of the number of times of communication to be performed between the apparatuses being reduced, it is possible to shorten a communication period between the information processing apparatus 100 and the server 200.

Still further, by the number of times of communication to be performed between the apparatuses being reduced, it is possible to reduce load on a network relating to the communication between the information processing apparatus 100 and the server 200, and it is possible to reduce load on the server 200.

Note that, after authentication and update of the information to be updated are performed through the processing relating to the information processing method according to the present embodiment, it is possible to perform transmission and reception of information between the apparatuses using the existing technology as illustrated in FIG. 5.

[2-2] Processing Relating to Information Processing Method According to the Present Embodiment The processing relating to the information processing method according to the present embodiment will be more specifically described below.

[2-2-1] Information Processing Method According to First Embodiment

To realize "execution of the authentication processing and the information update processing as a series of processing", it is necessary to implement the information processing method which eliminates necessity for waiting for authentication processing results of each other, at both apparatuses of the information processing apparatus 100 and the server 200.

Therefore, in the information processing system 1000, for example, an ephemeral key (in a method according to the existing technology, key information corresponding to an encryption key for a communication path to be utilized after mutual authentication) is generated first, and a data update processing start request including the ephemeral key is transmitted from the information processing apparatus 100 to the server 200. Further, the information processing apparatus 100 encrypts information required for data update by utilizing the above-described ephemeral key and includes the encrypted information required for data update in the data update processing start request. Still further, the information processing apparatus 100 includes the information to be updated in the data update processing start request so as to omit communication to be performed by the server 200 to confirm the information stored in the recording medium provided at the information processing apparatus 100.

In the information processing system 1000, the authentication processing and the information update processing are executed as a series of processing by the information processing apparatus 100 transmitting, for example, the data update processing start request as described above to the server 200.

Figure 8A:
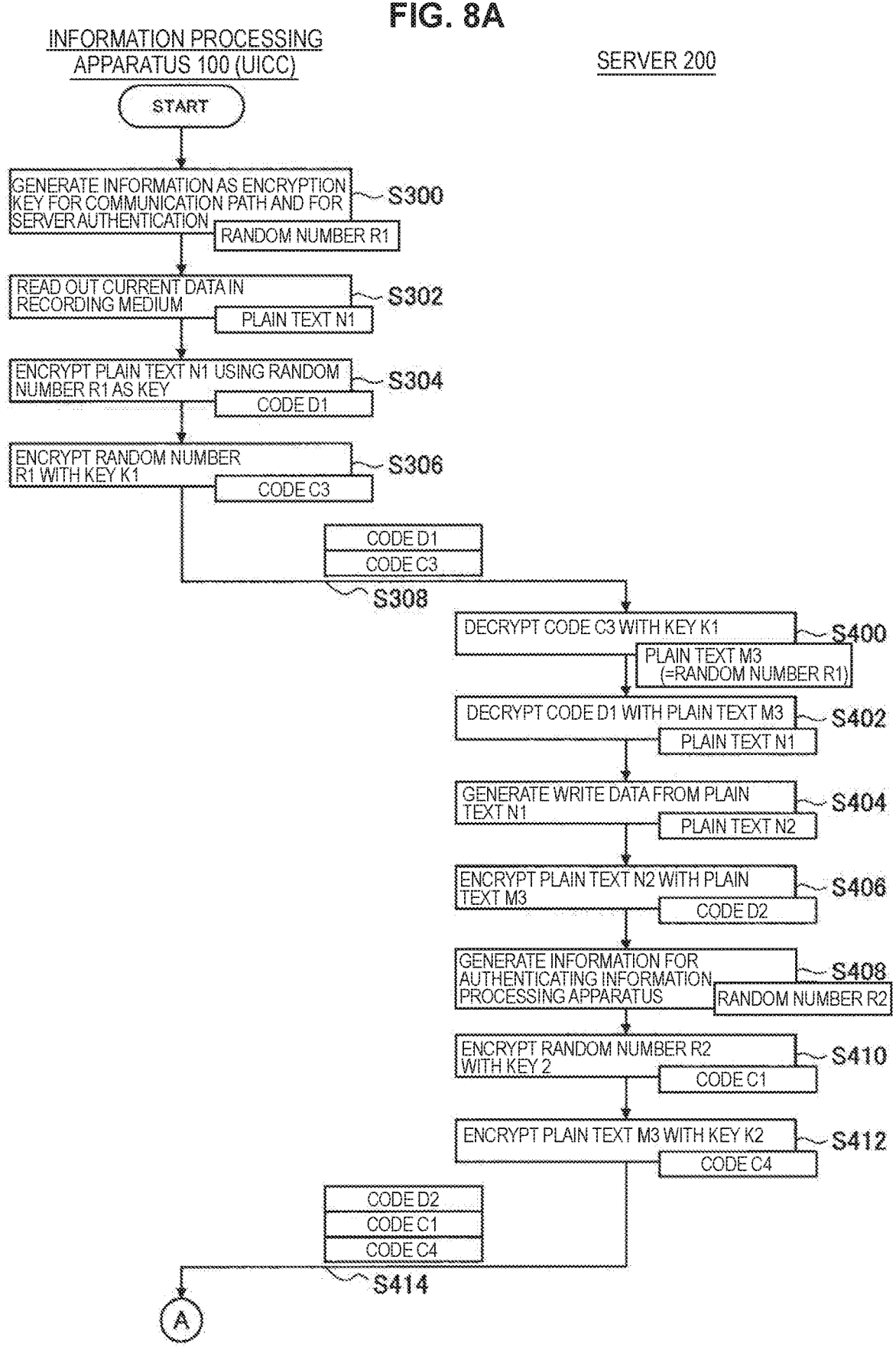
FIG. 8A is an explanatory diagram illustrating an example of processing relating to the information processing method according to a first embodiment.
Figure 8B:
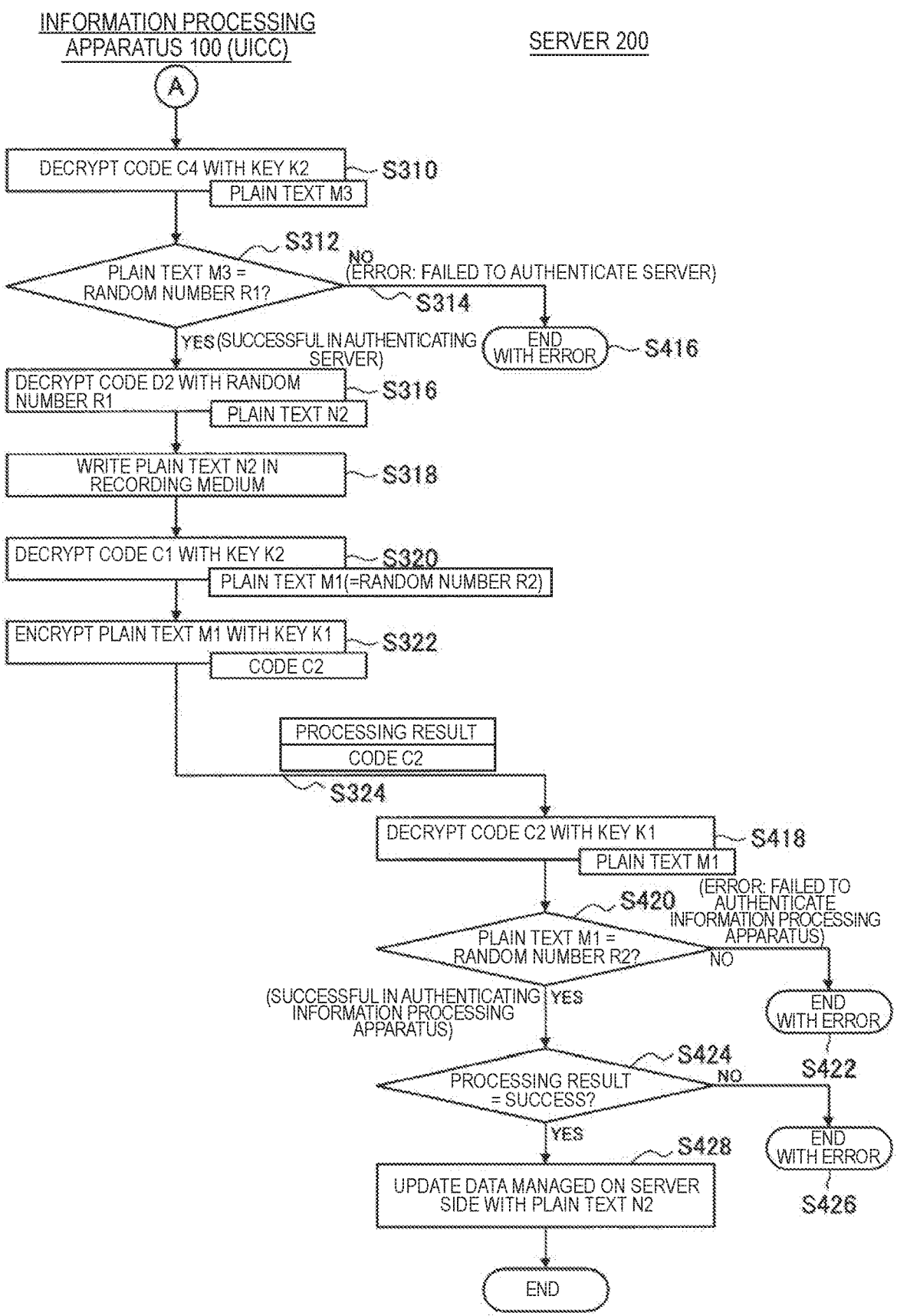
FIG. 8B is an explanatory diagram illustrating an example of processing relating to the information processing method according to a first embodiment.

FIG. 8A and FIG. 8B are explanatory diagrams illustrating an example of processing relating to an information processing method according to a first embodiment.

FIG. 8A and FIG. 8B are diagrams illustrating the processing for implementing communication illustrated in FIG. 6 more specifically. More specifically, processing from step S300 to S308 illustrated in FIG. 8A corresponds to an example of the processing in step S100 illustrated in FIG. 6, and processing from step S400 to S414 illustrated in FIG. 8A corresponds to an example of the processing in step S102 illustrated in FIG. 6. Further, processing from step S310 to S324 illustrated in FIG. 8B corresponds to the processing in step S104 illustrated in FIG. 6. Processing from step S416 to S428 illustrated in FIG. 8B corresponds to an example of the processing to be performed at the server 200 in step S104 and subsequent step in FIG. 6.

An example of the processing relating to the information processing method according to the first embodiment will be described below with reference to FIG. 8A and FIG. 8B as appropriate.

Here, a "random number R1" illustrated in FIG. 8A and FIG. 8B corresponds to an example of first authentication information according to the present embodiment, which is key information to be used by the information processing apparatus 100 to authenticate an external apparatus which is a communication target. Further, "plain text N1" illustrated in FIG. 8A and FIG. 8B corresponds to an example of information to be updated according to the present embodiment. Further, a "key K1" illustrated in FIG. 8A and FIG. 8B corresponds to first key information according to the present embodiment, which is one piece of key information shared between the information processing apparatus 100 and the server 200. Further, a "key K2" illustrated in FIG. 8A and FIG. 8B corresponds to second key information according to the present embodiment, which is another piece of key information shared between the information processing apparatus 100 and the server 200. Further, a "random number R2" illustrated in FIG. 8A and FIG. 8B corresponds to second authentication information according to the present embodiment, which is key information to be used by the server 200 to authenticate an external apparatus which is a communication target.

Further, in FIG. 8A and FIG. 8B, encrypted information is indicated as a "code", and encrypted information is indicated as "plain text".

[i] Processing from Step S300 to S308 (FIG. 8A)

The information processing apparatus 100 generates a random number R1 (S300). The random number R1 plays a role of an encryption key for encrypting a communication path and an encryption key for authenticating the server 200.

The information processing apparatus 100 reads out current data stored in the recording medium (S302). The data read out in step S302 corresponds to the information to be updated.

The information processing apparatus 100 encrypts the data read out in step S302 using the random number R1 generated in step S300 as a key (S304).

Further, the information processing apparatus 100 encrypts the random number R1 with a key K1 which is shared with the server 200 (an example of the external apparatus which is a communication target) (S306).

The information processing apparatus 100 then transmits a processing request including a code D1 encrypted in step S304 and a code C3 encrypted in step S306 (S308).

As processing in step S100 illustrated in FIG. 6, the information processing apparatus 100, for example, performs processing from step S300 to S308 in FIG. 8A.

Here, as indicated in step S304 and S306, the information processing apparatus 100 encrypts each of the information to be updated and the first authentication information. The information processing apparatus 100 encrypts the information to be updated with the first authentication information and encrypts the first authentication information with the first key information.

The information processing apparatus 100 then causes a provided communication device (or a connected external communication device) to transmit a processing request including the encrypted information to be updated and the encrypted first authentication information to the server 200 which is the external apparatus which is a communication target as indicated in step S308.

[ii] Processing from Step S400 to S414 (FIG. 8A)

The server 200 which receives the processing request from the information processing apparatus 100 in step S308, decrypts the code C3 with the key K1 (S400). As a result of the code C3 being decrypted in step S400, the server 200 acquires the random number R1.

The server 200 decrypts the code D1 with the random number R1 acquired in step S400 (S402). As a result of the code D1 being decrypted in step S400, the server 200 acquires the information to be updated.

The server 200 generates write data on the basis of the information to be updated acquired in step S402 (S404). The write data is an example of update information for updating the information to be updated. Examples of the update information according to the present embodiment can include, for example, data for replacing the information to be updated, data indicating a value to be added to a value indicated by the information to be updated, or the like.

The server 200 encrypts the write data generated in step S404 with the random number R1 acquired in step S400 (S406).

The server 200 generates a random number R2 (S408). The random number R2 plays a role of an encryption key for authenticating the information processing apparatus 100.

The server 200 encrypts the random number R2 generated in step S408 with the key K2 shared with the information processing apparatus 100 (an example of the external apparatus which is a communication target) (S410).

The server 200 encrypts the random number R1 acquired in step S400 with the key K2 (S412).

The server 200 then transmits the code D2 encrypted in step S406, the code C1 encrypted in step S410, and the code C4 encrypted in step S412 to the information processing apparatus 100 which is an apparatus of a communication target (S414).

Here, the information transmitted in step S414 corresponds to response information transmitted by the server 200 in response to the processing request transmitted from the information processing apparatus 100 in step S308.

As the processing in step S102 illustrated in FIG. 6, the server 200 performs, for example, processing from step S400 to S414 in FIG. 8A.

Here, as indicated in step S400 and S402, in the case where the encrypted information to be updated and the encrypted first authentication information are acquired, the server 200 decrypts the encrypted first authentication information with the first key information and decrypts the encrypted information to be updated with the decrypted first authentication information.

Further, as indicated in step S404, the server 200 generates the update information for updating the information to be updated on the basis of the decrypted information to be updated.

Further, as indicated from step S408 to S412, the server 200 encrypts each of the update information, the first authentication information and the second authentication information. The server 200, for example, encrypts the update information with the first authentication information and encrypts each of the first authentication information and the second authentication information with the second key information.

Then, as indicated in step S414, the server 200 causes a provided communication device (or a connected external communication device) to transmit the encrypted update information, the encrypted first authentication information and the encrypted second authentication information to the information processing apparatus 100 which is an external apparatus of a communication target.

[iii] Processing from Step S310 to S324 (FIG. 8B)

In the case where the response information (response information in response to the processing request transmitted by the information processing apparatus 100 in step S308) transmitted from the server 200 in step S414 is received, the information processing apparatus 100 decrypts the received code C4 with the key K2 (S310).

The information processing apparatus 100 determines whether or not the information decrypted in step S310 matches the random number R1 (S312). Here, the processing in step S312 corresponds to the processing of the information processing apparatus 100 authenticating the server 200.

In the case where it is not determined in step S312 that the decrypted information matches the random number R1, the information processing apparatus 100 transmits a signal indicating an error to the server 200 (S314).

In the case where it is determined in step S312 that the decrypted information matches the random number R1, the information processing apparatus 100 decrypts the received code D2 with the random number R1 (S316). As a result of the code D2 being decrypted in step S316, the information processing apparatus 100 acquires the update information.

The information processing apparatus 100 writes the update information acquired in step S316 in the recording medium (S318). The processing in step S318 corresponds to the information update processing of updating the information to be updated at the information processing apparatus 100.

The information processing apparatus 100 decrypts the received code C1 with the key K2 (S320). As a result of the code C1 being decrypted in step S320, the information processing apparatus 100 acquires the random number R2.

The information processing apparatus 100 encrypts the decrypted random number R2 with the key K1 (S322).

The information processing apparatus 100 then transmits a processing result of a series of processing at the information processing apparatus 100 and the code C2 encrypted in step S322 to the server 200 which is an apparatus of a communication target (S324). The processing result of a series of processing transmitted in step S324 may be, for example, processing results of the authentication processing and the information updated processing or a processing result of the information update processing.

As the processing in step S104 illustrated in FIG. 6, the information processing apparatus 100, for example, performs processing from step S310 to S324 in FIG. 8A.

Here, as indicated in step S310 and S312, in the case where the response information transmitted from the external apparatus which is a communication target is acquired in response to the processing request, the information processing apparatus 100 decrypts the response information with the second key information, and determines whether the first authentication information is included in the information decrypted with the second key information to authenticate the external apparatus.

Further, in the case where the external apparatus which is a communication target is normally authenticated, as indicated in step S316 and S318, the information processing apparatus 100 decrypts the response information with the first authentication information and updates the information to be updated on the basis of the information decrypted with the first authentication information.

Further, as indicated from step S320 to S324, the information processing apparatus 100 encrypts the second authentication information included in the response information decrypted with the second key information, again. The information processing apparatus 100 encrypts the second authentication information with the first key information. The information processing apparatus 100 then causes a provided communication device (or a connected external communication device) to transmit the processing result of a series of processing at the information processing apparatus 100 and the encrypted second authentication information to the server 200 which is an external apparatus of a communication target.

[iv] Processing from Step S416 to S428 (FIG. 8B)

The server 200 which receives the signal indicating an error transmitted from the information processing apparatus 100 in step S314, finishes a series of processing with an error (S416). The processing is finished with an error in step S416 because the information processing apparatus 100 has failed to authenticate the server 200.

Further, the server 200 which receives the processing result and the code C2 (encrypted transmission information) transmitted from the information processing apparatus 100 in step S324 decrypts the received code C2 with the key K1 (S418).

The server 200 determines whether or not the information decrypted in step S418 matches the random number R2 (S420). Here, the processing in step S420 corresponds to the processing of the server 200 authenticating the information processing apparatus 100.

In the case where it is not determined in step S420 that the decrypted information matches the random number R2, the server 200 finishes a series of processing with an error (S422). The processing is finished with an error in step S422 because the server 200 has failed to authenticate the information processing apparatus 100.

Further, in the case where it is determined in step S420 that the decrypted information matches the random number R2, the server 200 determines whether the processing result transmitted from the information processing apparatus 100 in step S324 indicates that the processing has been successful (S424).

In the case where it is not determined in step S424 that the processing result indicates that the processing has been successful, the server 200 finishes a series of processing with an error (S426). The processing is finished with an error in step S426 because the information update processing has not been normally completed at the information processing apparatus 100. Because data managed on the server 200 side is not updated as a result of a series of processing being finished with an error in step S426, in the information processing system 1000, for example, the information to be updated is prevented from being tampered with, or the like, by an unauthorized terminal which has not been authenticated.

Further, in the case where it is determined ins step S424 that the processing result indicates that the processing has been successful, the server 200 updates the data managed on the server 200 side with the write data generated in step S404 in FIG. 8A (S428). The server 200 then normally finishes a series of processing.

As the processing in step S104 and subsequent step illustrated in FIG. 6, the server 200 performs, for example, processing from step S416 to S428 in FIG. 8B.

Here, as indicated from step S418 to S422, in the case where the processing result at the external apparatus and the encrypted transmission information, which are transmitted from the external apparatus, are acquired, the server 200 decrypts the encrypted transmission information with the first key information. The server 200 then determines whether the second authentication information is included in the transmission information decrypted with the first key information to authenticate the external apparatus.

Further, as indicated from step S424 to S428, in the case where the external apparatus is normally authenticated, the server 200 completes update of the information to be updated at the external apparatus in the case where the processing result indicates that the processing has been normally completed.

In the information processing system 1000, by each of the information processing apparatus 100 and the server 200 performing, for example, the processing illustrated in FIG. 8A and FIG. 8B, "execution of the authentication processing and the information update processing as a series of processing" is realized.

Therefore, by, for example, the processing illustrated in FIG. 8A and FIG. 8B being performed, it is possible to reduce the number of times of communication to be performed between the information processing apparatus 100 and the server 200 compared to a case where the existing technology illustrated in FIG. 5 is used.

Further, as a result of the number of times of communication to be performed between the information processing apparatus 100 and the server 200 being reduced, it is possible to shorten a communication period between the information processing apparatus 100 and the server 200.

Still further, as a result of the number of times of communication to be performed between the information processing apparatus 100 and the server 200 being reduced, it is possible to reduce load on a network relating to the communication between the information processing apparatus 100 and the server 200, and it is possible to reduce load on the server 200.

Note that it goes without saying that the processing relating to the information processing method according to the first embodiment is not limited to the processing illustrated in FIG. 8A and FIG. 8B.

[2-2-2] Information Processing Method According to Second Embodiment

For example, as illustrated in FIG. 6, FIG. 8A and FIG. 8B, in the information processing system 1000 to which the information processing method according to the present embodiment is applied, it is not necessary to confirm a result for each time of transaction between the information processing apparatus 100 and the server 200. Therefore, in the information processing system 1000, it is possible to integrate communication transmitted and received through a plurality of times of transaction in communication in which an existing technology is used.

FIG. 9 is an explanatory diagram illustrating an example of processing relating to an information processing method according to a second embodiment. FIG. 9 illustrates an example in the case where communication transmitted and received through a plurality of times of transaction in communication in which an existing technology is used is integrated.

Further, FIG. 9 illustrates processing at the information processing apparatus 100, which is separated into processing to be performed at the UICC and processing to be performed at the DH.

In a similar manner to step S100 in FIG. 6, the information processing apparatus 100 transmits a data update processing start request including a data uprate processing start command, information required for data update and information required for encrypting and decrypting the information (S500, S502).

The server 200 which receives the data update processing start request transmitted from the information processing apparatus 100 in step S500 and S502, transmits a plurality of authentication and data update requests on the basis of the information required for data update and the information required for encrypting and decrypting the information (S504).

The information processing apparatus 100 which receives the plurality of authentication and data update requests, which are transmitted from the server 200 in step S504, performs authentication processing and data update processing respectively corresponding to the plurality of authentication and data update requests (S506). Here, FIG. 9 illustrates an example where the authentication processing and the data update processing respectively corresponding to the plurality of authentication and data update requests are sequentially performed at the information processing apparatus 100. Note that two or more types of authentication processing and data update processing may be performed in parallel at the information processing apparatus 100.

The information processing apparatus 100 then transmits processing results respectively corresponding to the plurality of authentication and data update requests (S508).

For example, as illustrated in FIG. 9, by the communication transmitted and received through a plurality of times of transaction in communication in which an existing technology is used being integrated, it is possible to reduce the number of times of communication to be performed between the server 200 and the information processing apparatus 100 compared to a case where the existing technology illustrated in FIG. 5 is used.

Further, as a result of the number of times of communication to be performed between the information processing apparatus 100 and the server 200 being reduced, it is possible to provide effects similar to those provided by the processing relating to the above-described first information processing method being performed.

[2-2-3] Information Processing Method According to a Third Embodiment

For example, "upon transmission of the date update processing start request in step S100 in FIG. 6, or upon transmission of the data update processing start request in step S200 in FIG. 7, in the case where a session is established between the information processing apparatus 100 and the server 200", processing relating to other communication (processing relating to communication other than a series of processing) is excluded.

However, if a session is not established between the information processing apparatus 100 and the server 200, it is impossible to prevent the information to be updated from being updated through processing other than a series of processing.

Figure 10:
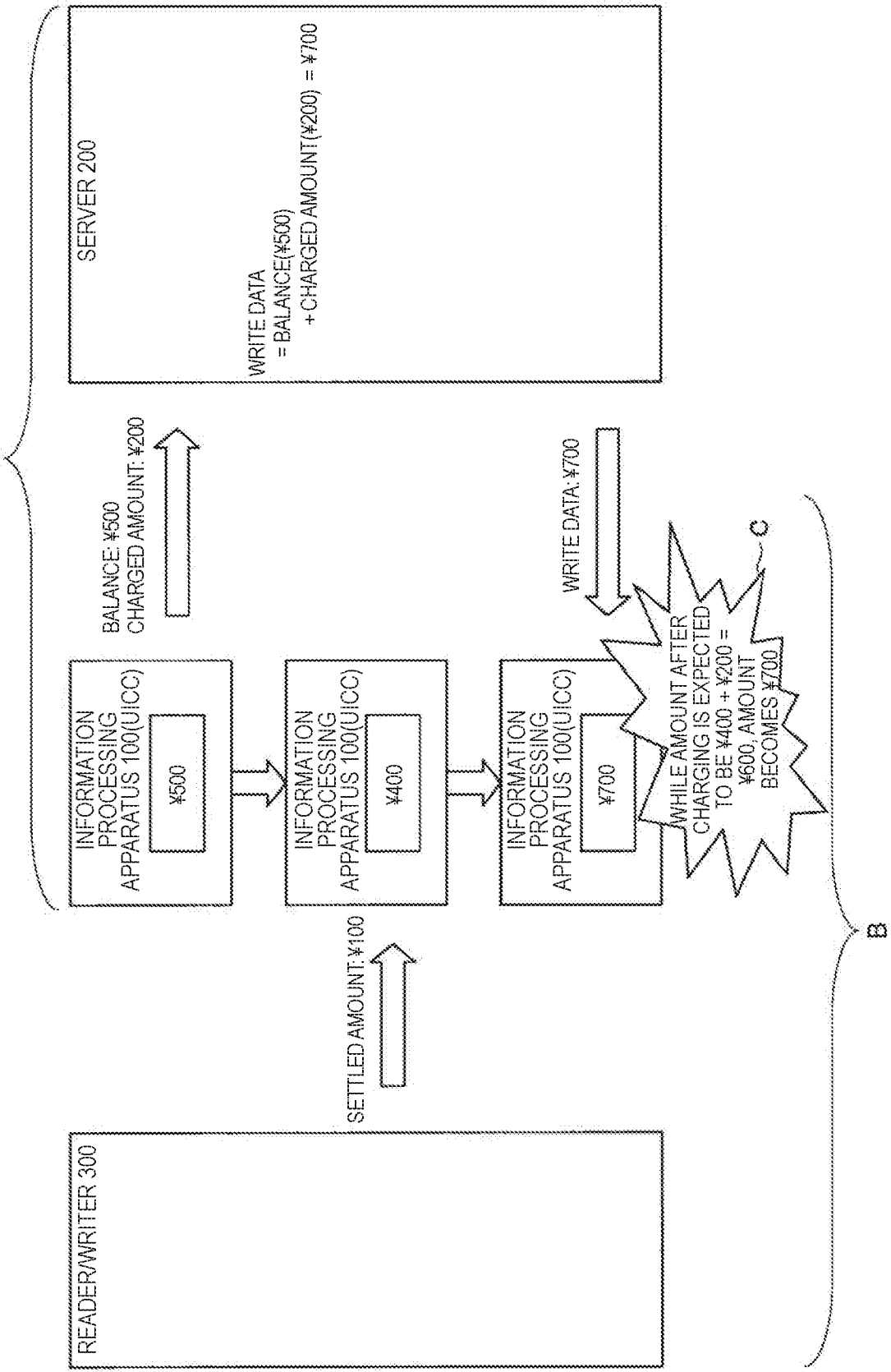
FIG. 10 is an explanatory diagram illustrating an example of a case where information to be updated is updated through processing other than a series of processing according to the present embodiment.

FIG. 10 is an explanatory diagram illustrating an example of a case where the information to be updated is updated through processing other than a series of processing according to the present embodiment. FIG. 10 illustrates an example of processing in the case where a value of electronic value stored in a recording medium constituting the UICC of the information processing apparatus 100 is updated.

Note that, as described above, the case illustrated in FIG. 10 is a case which can occur in the case where a session is not established between the information processing apparatus 100 and the server 200. In the case where the information processing method according to the above-described first embodiment and the information processing method according to the above-described second embodiment are applied, the case illustrated in FIG. 10 does not occur by a session being established between the information processing apparatus 100 and the server 200.

For example, "in the case where, while a series of processing relating to update of electronic value is executed between the information processing apparatus 100 and the server 200 as illustrated in A in FIG. 10, another communication relating to update of the electronic value is performed between the information processing apparatus 100 and the reader/writer 300 as illustrated in B in FIG. 10", there is a possibility that inconsistency occurs in a value of the electronic value as illustrated in C in FIG. 10.

Therefore, as processing relating to the information processing method according to the third embodiment, processing which is capable of further preventing the information to be updated from being updated through processing other than a series of processing will be described next. The processing relating to the information processing method according to the third embodiment described below is performed, for example, in addition to the processing relating to the information processing method according to the above-described first embodiment or the processing relating to the information processing method according to the second embodiment.

Note that the processing relating to the information processing method according to the third embodiment can be applied both in the case where a session is not established between the information processing apparatus 100 and the server 200 in the information processing system 1000 and in the case where a session is established between the information processing apparatus 100 and the server 200.

In the information processing system 1000, a state of the information to be updated upon start of a series of processing is exchanged between the information processing apparatus 100 and the server 200. In the information processing system 1000, the information processing apparatus 1000 confirms that a state of the information to be updated before update matches a state of the information to be updated upon start of a series of processing before the information to be updated is updated on the basis of the update information.

Then, in the information processing system 1000, in the case where the state of the information to be updated before update matches the state of the information to be updated upon start of a series of processing, the information processing apparatus 100 updates the information to be updated on the basis of the update information. Meanwhile, the information processing apparatus 100) does not update the information to be updated on the basis of the update information in the case where the state of the information to be updated before update does not match the state of the information to be updated upon start of a series of processing.

As described above, in the information processing system 1000, by whether the information to be updated is updated through processing other than a series of processing being detected during a series of processing, it is possible to prevent the information to be updated from being updated through processing other than a series of processing.

Figure 11:
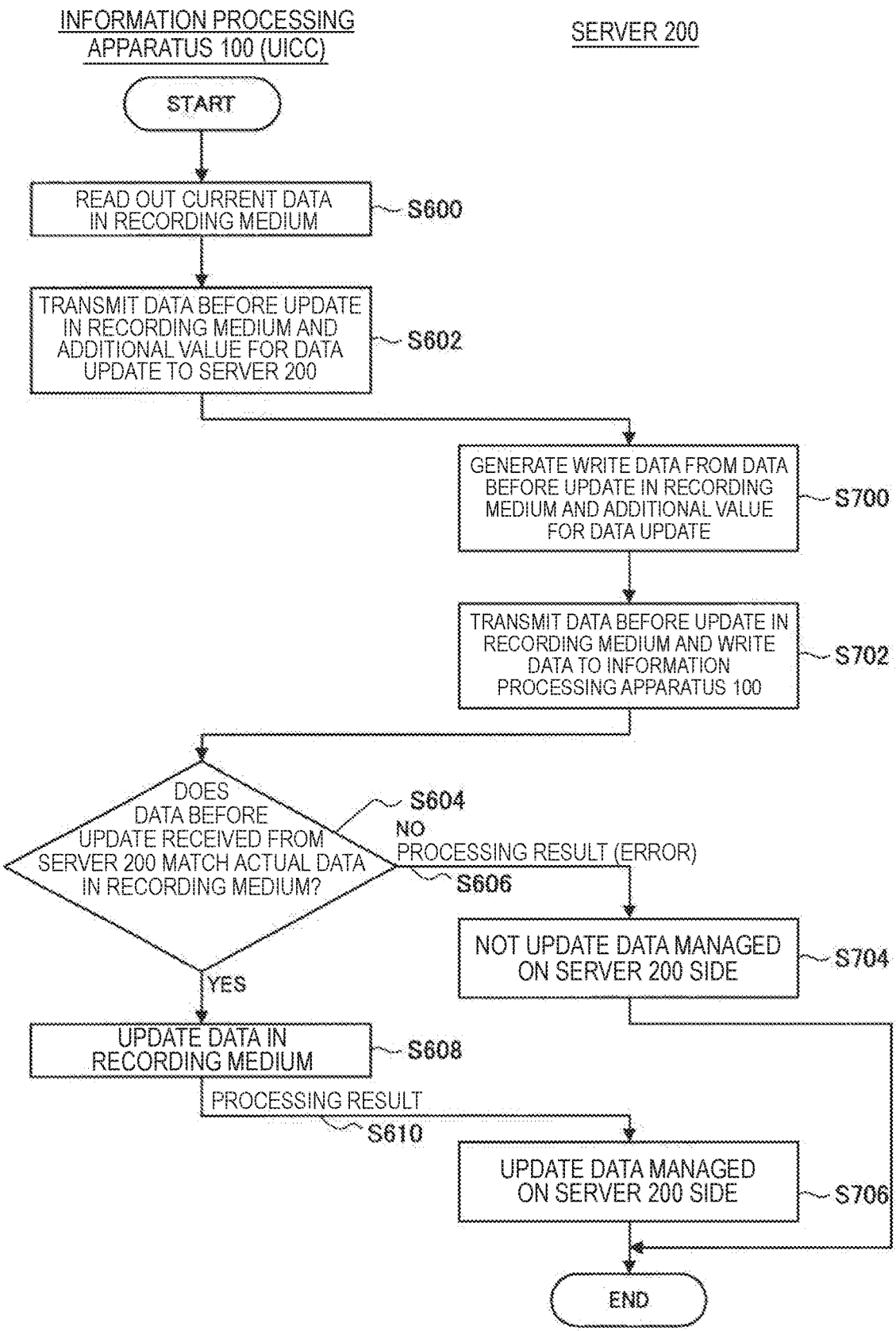
FIG. 11 is an explanatory diagram illustrating an example of processing relating to an information processing method according to a third embodiment.

FIG. 11 is an explanatory diagram illustrating an example of the processing relating to the information processing method according to the third embodiment. FIG. 11 illustrates part of the processing relating to the information processing method according to the third embodiment among a series of processing. For example, processing in step S600 and S602 in FIG. 11 corresponds to part of the processing from step S300 to S308 in FIG. 8A, and processing in step S700 and S702 in FIG. 11 corresponds to part of the processing from step S400 to S414 in FIG. 8A. Further, for example, processing from step S604 to S610 in FIG. 11 corresponds to part of the processing from step S310 to S324 in FIG. 8B, and processing in step S704 and S706 in FIG. 11 corresponds to part of the processing from step S416 to S428 in FIG. 8B.

Further, FIG. 11 illustrates an example of processing in the case where the information to be updated is electronic value, and a processing request for increasing a value of the electronic value (so-called, a processing request for charging) is transmitted from the information processing apparatus 100 to the server 200.

The information processing apparatus 100 reads out current data (information to be updated) which is stored in the recording medium (S600). Here, the data read out in step S600 corresponds to data before update.

The information processing apparatus 100 transmits the data before update read out in step S600 and an additional value for updating the data (hereinafter, referred to as an "additional value for data update") to the server 200 (S602). By the processing in step S602 being performed, the state of the information to be updated upon start of a series of processing is shared between the information processing apparatus 100 and the server 200.

The server 200 which receives the data before update and the additional value for data update, which are transmitted from the information processing apparatus 100 in step S602, generates write data (update information) on the basis of the received data before update and additional value for data update (S700). As indicated, for example, from step S400 to S404 in FIG. 8A, the server 200 decrypts the received data before update and additional value for data update to generate the write data.

The server 200 transmits the data before update transmitted in step S600 and the write data generated in step S700 to the information processing apparatus 100 (S702).

The server 200, for example, encrypts the decrypted data before update (information to be updated) as the information before update. The server 200 encrypts the information before update with the random number R1, for example, in a similar manner to the write data. The server 200 then further transmits the encrypted information before update to the information processing apparatus 100 (external apparatus) in addition to the information to be transmitted in step S414 in FIG. 8A.

In the information processing system 1000, the state of the information to be updated upon start of a series of processing is exchanged between the information processing apparatus 100 and the server 200 through the processing in step S602 and the processing in step S702.

The information processing apparatus 100 which receives the data before update transmitted from the server 200 in step S702, determines whether or not the received data before update matches actual data stored in the recording medium (S604). The information processing apparatus 100 performs the processing in step S604 after, for example, the processing from step S310 to S316 in FIG. 8B is performed, before the processing in step S318 is performed.

The information processing apparatus 100 determines whether or not the data before update matches the actual data by, for example, comparing binary between the data before update and the actual data or comparing between a hash value of the data before update and a hash value of the actual data.

In the case where it is not determined in step S604 that the data before update matches the actual data, the information processing apparatus 100 transmits a processing result indicating an error to the server 200 without updating the data in the recording medium with the write data transmitted from the server 200 in step S702 (S606).

The server 200 which receives the processing result indicating an error transmitted in step S606 does not update the data managed on the server 200 side (S704).

Through the processing in step S606 and the processing in step S704, in the information processing system 1000), the information to be updated is prevented from being updated through processing other than a series of processing.

Further, in the case where it is determined in step S604 that the data before update matches the actual data, the information processing apparatus 100 updates the data in the recording medium with the write data transmitted from the server 200 in step S702 (S608). That is, in the case where the information before update transmitted from the server 200 matches the information to be updated, the information processing apparatus 100 updates the information to be updated with the update information transmitted from the server 200.

The information processing apparatus 100 then transmits a processing result indicating that the processing has been normally completed to the server 200 (S610).

The server 200 which receives the processing result indicating that the processing has been normally completed, transmitted in step S610, updates the data managed on the server 200 side with the write data generated in step S700 (S704).

Through the processing in step S608, the processing in step S610 and the processing in step S706, in the information processing system 1000, the information to be updated is updated through a series of processing.

In the information processing system 1000, for example, by the processing as illustrated in FIG. 11 being performed, whether the information to be updated is updated through processing other than a series of processing is detected during a series of processing, and the information to be updated is prevented from being updated through processing other than a series of processing. Note that it goes without saying that an example of the processing according to the third embodiment is not limited to the example illustrated in FIG. 11.

Figure 12:
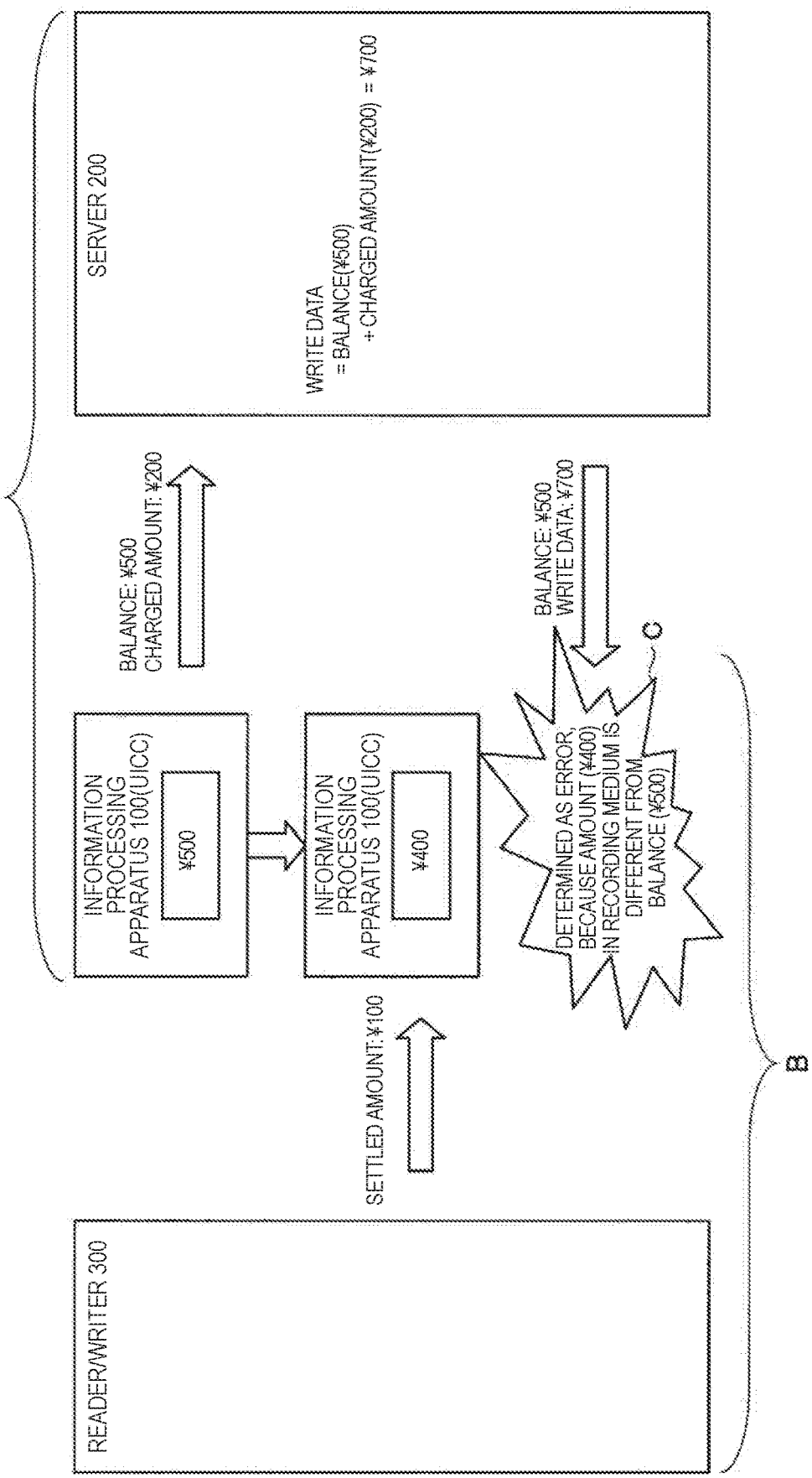
FIG. 12 is an explanatory diagram illustrating an example of effects of the processing relating to the information processing method according to the third embodiment.

FIG. 12 is an explanatory diagram illustrating an example of effects of the processing relating to the information processing method according to the third embodiment. FIG. 12 illustrates an example of a case where the information to be updated is prevented from being updated through processing other than a series of processing. In a similar manner to FIG. 10, FIG. 12 illustrates an example of processing in the case where a value of electronic value stored in the recording medium which constitutes the UICC of the information processing apparatus 100 is updated.

For example, "in the case where, while a series of processing relating to update of electronic value is executed between the information processing apparatus 100 and the server 200 as illustrated in A in FIG. 12, another communication relating to update of the electronic value is performed between the information processing apparatus 100 and the reader/writer 300 as illustrated in B in FIG. 12", there is a possibility that the electronic value stored in the recording medium provided at the information processing apparatus may be updated through the other communication.

However, in the case where the information processing method according to the third embodiment is applied, as illustrated in A in FIG. 12, balance upon start of a series of processing (an example of the state of the information to be updated upon start of a series of processing) is exchanged between the information processing apparatus 100 and the server 200. Further, the information processing apparatus 100 confirms that an actual value of the electronic value before update matches the balance upon start of a series of processing before the electronic value (an example of the information to be updated) is updated on the basis of the write data (update information). Then, as illustrated in C in FIG. 12, the information processing apparatus 100 determines that an error occurs in a series of processing in the case where inconsistency occurs in the value of the electronic value, and does not update the electronic value on the basis of the write data.

Therefore, in the information processing system 1000 to which the information processing method according to the third embodiment is applied, inconsistency in the value of the electronic value as illustrated in C in FIG. 10 is prevent from occurring.

Further, as described above, the processing relating to the information processing method according to the third embodiment is performed in addition to, for example, the processing relating to the information processing method according to the above-described first embodiment or the processing relating to the information processing method according to the second embodiment. Therefore, in the information processing system 1000 to which the information processing method according to the third embodiment is applied, effects are provided, which are similar to those provided in the case where the information processing method according to the first embodiment is applied or in the case where the information processing method according to the second embodiment is applied.

(Program According to the Present Embodiment)

[I] Program for Causing Computer System to Function as First Information Processing Apparatus By a program for causing a computer system to function as the first information processing apparatus according to the present embodiment (for example, a program which can execute the processing relating to the information processing method according to the present embodiment at the first information processing apparatus, such as processing relating to the first information processing method to processing relating to the third information processing method at the information processing apparatus 100 which constitutes the information processing system 1000) being executed by a processor, or the like, in the computer system, in the case where information is securely updated through communication between apparatuses, it is possible to reduce the number of times of communication to be performed between the apparatuses. Here, examples of the computer system according to the present embodiment can include a single computer and a plurality of computers. By the computer system according to the present embodiment, a series of processing relating to the information processing method according to the present embodiment at the first information processing apparatus is performed.

Further, by a program for causing a computer system to function as the first information processing apparatus according to the present embodiment being executed by a processor, or the like, in the computer system, it is possible to provide effects provided by the processing relating to the information processing method according to the present embodiment at the above-described information processing apparatus 100 (first information processing apparatus).

[11] Program for Causing Computer System to Function as Second Information Processing Apparatus By a program for causing a computer system to function as the relay apparatus according to the present embodiment (for example, a program which can execute the processing relating to the information processing method according to the present embodiment at the second information processing apparatus, such as processing relating to the first information processing method to processing relating to the third information processing method at the server 200 which constitutes the information processing system 1000) being executed by a processor, or the like, in the computer system, in the case where information is securely updated through communication between apparatuses, it is possible to reduce the number of times of communication to be performed between the apparatuses.

Further, by a program for causing a computer system to function as the second information processing apparatus according to the present embodiment being executed by a processor, or the like, in the computer system, it is possible to provide effects provided by the processing relating to the information processing method according to the present embodiment at the above-described server 200 (second information processing apparatus).

The preferred embodiment(s) of the present disclosure has/have been described above with reference to the accompanying drawings, whilst the present disclosure is not limited to the above examples. A person skilled in the art may find various alterations and modifications within the scope of the appended claims, and it should be understood that they will naturally come under the technical scope of the present disclosure.

For example, while a case has been described above where programs (computer programs) for causing a computer system to function as the first information processing apparatus according to the present embodiment or the second information processing apparatus according to the present embodiment are provided, the present embodiment can further provide recording media in which the above-described programs are respectively stored or a recording medium in which both the above-described programs are stored.

The above-described configuration is merely an example of the present embodiment, and naturally belongs to a technical scope of the present disclosure.

Further, the effects described in this specification are merely illustrative or exemplified effects, and are not limitative. That is, with or in the place of the above effects, the technology according to the present disclosure may achieve other effects that are clear to those skilled in the art from the description of this specification.

Additionally, the present technology may also be configured as below.

(1)

An information processing apparatus including:

a processing unit configured to execute processing of authenticating an external apparatus through communication with the external apparatus which is a communication target and processing of updating information to be updated through communication with the external apparatus, as a series of processing.

(2)

The information processing apparatus according to (1), in which the processing unit encrypts each of the information to be updated and first authentication information for authenticating the external apparatus, and causes a processing request including the encrypted information to be updated and the encrypted first authentication information to be transmitted to the external apparatus.

(3)

The information processing apparatus according to (2), in which the processing unit encrypts the information to be updated with the first authentication information, and encrypts the first authentication information with first key information shared with the external apparatus.

(4)

The information processing apparatus according to (2) or (3), in which, in a case where response information transmitted from the external apparatus in response to the processing request is acquired, the processing unit decrypts the response information with second key information shared with the external apparatus and determines whether the first authentication information is included in the information decrypted with the second key information to authenticate the external apparatus.

(5)

The information processing apparatus according to (4), in which, in a case where the external apparatus is normally authenticated, the processing unit decrypts the response information with the first authentication information and updates the information to be updated on the basis of the information decrypted with the first authentication information.

(6)

The information processing apparatus according to (5), in which information before update recognized by the external apparatus and update information for updating the information to be updated are included in the information decrypted with the first authentication information, and the processing unit updates the information to be updated with the update information in a case where the information before update matches the information to be updated.

(7)

The information processing apparatus according to (5) or (6), in which the processing unit encrypts again second authentication information to be used by the external apparatus to authenticate the information processing apparatus, included in the response information decrypted with the second key information, and causes a processing result of the series of processing at the information processing apparatus and the encrypted second authentication information to be transmitted to the external apparatus.

(8)

The information processing apparatus according to (7), in which the processing unit encrypts the second authentication information with first key information shared with the external apparatus.

(9)

The information processing apparatus according to any one of (1) to (8), in which the processing unit executes the series of processing on the basis of a processing start request transmitted from the external apparatus.

(10)

An information processing apparatus including:

a processing unit configured to execute processing of authenticating an external apparatus through communication with the external apparatus which is a communication target, and processing of updating information to be updated at the external apparatus through communication with the external apparatus, as a series of processing.

(11)

The information processing apparatus according to (10), in which, in a case where the information to be updated which is encrypted and encrypted first authentication information to be used by the external apparatus to authenticate the information processing apparatus, which are transmitted from the external apparatus, are acquired, the processing unit decrypts the encrypted first authentication information with first key information shared with the external apparatus and decrypts the encrypted information to be updated with the decrypted first authentication information, generates update information for updating the information to be updated on the basis of the decrypted information to be updated, encrypts each of the update information, first authentication information, and second authentication information for authenticating the external apparatus, and causes the encrypted update information, the encrypted first authentication information and the encrypted second authentication information to be transmitted to the external apparatus.

(12)

The information processing apparatus according to (11), in which the processing unit encrypts the update information with the first authentication information, and encrypts each of the first authentication information and the second authentication information with second key information shared with the external apparatus.

(13)

The information processing apparatus according to (11) or (12), in which the processing unit further encrypts the decrypted information to be updated as information before update, and causes the encrypted information before update, the encrypted update information, the encrypted first authentication information and the encrypted second authentication information to be transmitted to the external apparatus.

(14)

The information processing apparatus according to any one of (11) to (13), in which, in a case where a processing result at the external apparatus and encrypted transmission information, which are transmitted from the external apparatus, are acquired, the processing unit decrypts the encrypted transmission information with the first key information, and determines whether the second authentication information is included in the transmission information decrypted with the first key information to authenticate the external apparatus.

(15) The information processing apparatus according to (14), in which, in a case where the external apparatus is normally authenticated, the processing unit completes update of the information to be updated at the external apparatus in a case where the processing result indicates that processing has been normally completed.

(16) An information processing method to be executed by an information processing apparatus, the information processing method including:

a step of executing processing of authenticating an external apparatus through communication with the external apparatus which is a communication target, and processing of updating information to be updated through communication with the external apparatus, as a series of processing.

(17) An information processing method to be executed by an information processing apparatus, the information processing method including:

a step of executing processing of authenticating an external apparatus through communication with the external apparatus which is a communication target, and processing of updating information to be updated at the external apparatus through communication with the external apparatus, as a series of processing.

REFERENCE SIGNS LIST 10, 100 information processing apparatus
20, 200 server
102, 202 communication unit
104, 204 control unit
110, 210 processing unit
300 reader/writer
1000 information processing system

The invention claimed is:

1. An information processing apparatus comprising:
circuitry configured to
execute processing of authenticating an external apparatus through communication with the external apparatus which is a communication target and processing of updating information to be updated through communication with the external apparatus, as a series of processing,
encrypt each of the information to be updated and first authentication information for authenticating the external apparatus, and
cause a processing request including the encrypted information to be updated and the encrypted first authentication information to be transmitted to the external apparatus,
wherein, in a case where response information transmitted from the external apparatus in response to the processing request is acquired, the circuitry is further configured to decrypt the response information with second key information shared with the external apparatus and determine whether the first authentication information is included in the information decrypted with the second key information to authenticate the external apparatus, and
wherein, in a case where the external apparatus is authenticated, the circuitry is further configured to decrypt the response information with the first authentication information and update the information to be updated on a basis of the information decrypted with the first authentication information.

2. The information processing apparatus according to claim 1,
wherein the circuitry is further configured to
encrypt the information to be updated with the first authentication information, and
encrypt the first authentication information with first key information shared with the external apparatus.

3. The information processing apparatus according to claim 1,
wherein information before update recognized by the external apparatus and update information for updating the information to be updated are included in the information decrypted with the first authentication information, and
wherein the circuitry is further configured to update the information to be updated with the update information in a case where the information before update matches the information to be updated.

4. The information processing apparatus according to claim 1,
wherein the circuitry is further configured to
encrypt again second authentication information to be used by the external apparatus to authenticate the information processing apparatus, included in the response information decrypted with the second key information, and
cause a processing result of the series of processing at the information processing apparatus and the encrypted second authentication information to be transmitted to the external apparatus.

5. The information processing apparatus according to claim 4,
wherein the circuitry is further configured to encrypt the second authentication information with first key information shared with the external apparatus.

6. The information processing apparatus according to claim 1,
wherein the circuitry is further configured to execute the series of processing on a basis of a processing start request transmitted from the external apparatus.

7. An information processing apparatus comprising:
circuitry configured to
execute processing of authenticating an external apparatus through communication with the external apparatus which is a communication target, and processing of updating information to be updated at the external apparatus through communication with the external apparatus, as a series of processing,
encrypt each of the information to be updated and first authentication information for authenticating the external apparatus, and
cause a processing request including the encrypted information to be updated and the encrypted first authentication information to be transmitted to the external apparatus,
wherein, in a case where response information transmitted from the external apparatus in response to the processing request is acquired, the circuitry is further configured to decrypt the response information with second key information shared with the external apparatus and determine whether the first authentication information is included in the information decrypted with the second key information to authenticate the external apparatus, and wherein, in a case where the external apparatus is authenticated, the circuitry is further configured to decrypt the response information with the first authentication information and update the information to be updated on a basis of the information decrypted with the first authentication information.

8. The information processing apparatus according to claim 7,
wherein, in a case where the information to be updated which is encrypted and encrypted first authentication information to be used by the external apparatus to authenticate the information processing apparatus, which are transmitted from the external apparatus, are acquired, the circuitry is further configured to
decrypt the encrypted first authentication information with first key information shared with the external apparatus and decrypt the encrypted information to be updated with the decrypted first authentication information,
generate update information for updating the information to be updated on a basis of the decrypted information to be updated,
encrypt each of the update information, first authentication information, and second authentication information for authenticating the external apparatus, and
cause the encrypted update information, the encrypted first authentication information, and the encrypted second authentication information to be transmitted to the external apparatus.

9. The information processing apparatus according to claim 8,
wherein the circuitry is further configured to encrypt the update information with the first authentication information, and encrypt each of the first authentication information and the second authentication information with second key information shared with the external apparatus.

10. The information processing apparatus according to claim 8,
wherein the circuitry is further configured to encrypt the decrypted information to be updated as information before update, and
cause the encrypted information before update, the encrypted update information, the encrypted first authentication information and the encrypted second authentication information to be transmitted to the external apparatus.

11. The information processing apparatus according to claim 8,
wherein, in a case where a processing result at the external apparatus and encrypted transmission information, which are transmitted from the external apparatus, are acquired,
the circuitry is further configured to decrypt the encrypted transmission information with the first key information, and determine whether the second authentication information is included in the transmission information decrypted with the first key information to authenticate the external apparatus.

12. The information processing apparatus according to claim 11,
wherein, in a case where the external apparatus is normally authenticated,
the circuitry is further configured to complete update of the information to be updated at the external apparatus in a case where the processing result indicates that processing has been completed.

13. An information processing method to be executed by an information processing apparatus, the information processing method comprising:
executing processing of authenticating an external apparatus through communication with the external apparatus which is a communication target, and processing of updating information to be updated through communication with the external apparatus, as a series of processing;
encrypting each of the information to be updated and first authentication information for authenticating the external apparatus;
causing a processing request including the encrypted information to be updated and the encrypted first authentication information to be transmitted to the external apparatus;
in a case where response information transmitted from the external apparatus in response to the processing request is acquired, decrypting the response information with second key information shared with the external apparatus and determining whether the first authentication information is included in the information decrypted with the second key information to authenticate the external apparatus; and
in a case where the external apparatus is authenticated, decrypting the response information with the first authentication information and updating the information to be updated on a basis of the information decrypted with the first authentication information.

14. An information processing method to be executed by an information processing apparatus, the information processing method comprising:
a step of executing processing of authenticating an external apparatus through communication with the external apparatus which is a communication target, and processing of updating information to be updated at the external apparatus through communication with the external apparatus, as a series of processing;
encrypting each of the information to be updated and first authentication information for authenticating the external apparatus;
causing a processing request including the encrypted information to be updated and the encrypted first authentication information to be transmitted to the external apparatus;
in a case where response information transmitted from the external apparatus in response to the processing request is acquired, decrypting the response information with second key information shared with the external apparatus and determining whether the first authentication information is included in the information decrypted with the second key information to authenticate the external apparatus; and
in a case where the external apparatus is authenticated, decrypting the response information with the first authentication information and updating the information to be updated on a basis of the information decrypted with the first authentication information.

* * * * *